(12) United States Patent
Hirasawa et al.

(10) Patent No.: US 9,542,729 B2
(45) Date of Patent: *Jan. 10, 2017

(54) IMAGE PROCESSING DEVICE, METHOD OF CONTROLLING IMAGE PROCESSING DEVICE, AND PROGRAM FOR CAUSING COMPUTER TO EXECUTE THE SAME METHOD

(71) Applicant: SONY CORPORATION, Tokyo (JP)

(72) Inventors: Yasutaka Hirasawa, Tokyo (JP); Natsuki Kano, Tokyo (JP)

(73) Assignee: Sony Corporation, Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 14/481,400

(22) Filed: Sep. 9, 2014

(65) Prior Publication Data

US 2014/0376781 A1 Dec. 25, 2014

Related U.S. Application Data

(63) Continuation of application No. 13/485,171, filed on May 31, 2012, now Pat. No. 8,891,829.

(30) Foreign Application Priority Data

Jun. 7, 2011 (JP) ................. 2011-127098

(51) Int. Cl.
*G06K 9/00* (2006.01)
*G06T 5/00* (2006.01)
*G06T 5/20* (2006.01)
*H04N 5/232* (2006.01)
*H04N 5/262* (2006.01)

(52) U.S. Cl.
CPC ................. *G06T 5/002* (2013.01); *G06T 5/20* (2013.01); *H04N 5/23229* (2013.01); *H04N 5/2621* (2013.01)

(58) Field of Classification Search
CPC ....... G06T 5/002; G06T 5/20; H04N 5/23229; H04N 5/2621
USPC ......................................... 382/106
See application file for complete search history.

(56) References Cited

U.S. PATENT DOCUMENTS

| 7,480,407 | B2 | 1/2009 | Imamura et al. |
| 8,384,763 | B2 | 2/2013 | Tam et al. |
| 2010/0208944 | A1 | 8/2010 | Fukunishi |
| 2011/0069224 | A1 | 3/2011 | Gross et al. |
| 2012/0069005 | A1 | 3/2012 | Seen et al. |
| 2012/0127270 | A1 | 5/2012 | Zhang et al. |
| 2013/0107015 | A1 | 5/2013 | Morioka et al. |
| 2013/0147911 | A1 | 6/2013 | Karsch et al. |
| 2013/0188873 | A1 | 7/2013 | Sasaki |

FOREIGN PATENT DOCUMENTS

JP 2009-229732 10/2009

*Primary Examiner* — Yon Couso
(74) *Attorney, Agent, or Firm* — Paratus Law Group, PLLC

(57) ABSTRACT

There is provided an image processing device including a depth acquisition unit and a smoothing processing unit. The depth acquisition unit acquires a depth to a subject in correlation with a pixel in a captured image of the subject, and the smoothing processing unit designates a pixel in a region excluding a predetermined region in the image as a target pixel, and performs a smoothing process of the degree according to the depth corresponding to the target pixel for a pixel value of the target pixel in a predetermined direction. This causes a pixel in a region excluding the predetermined region in the image to be blurred, thereby generating a panning image.

7 Claims, 19 Drawing Sheets

FIG.3
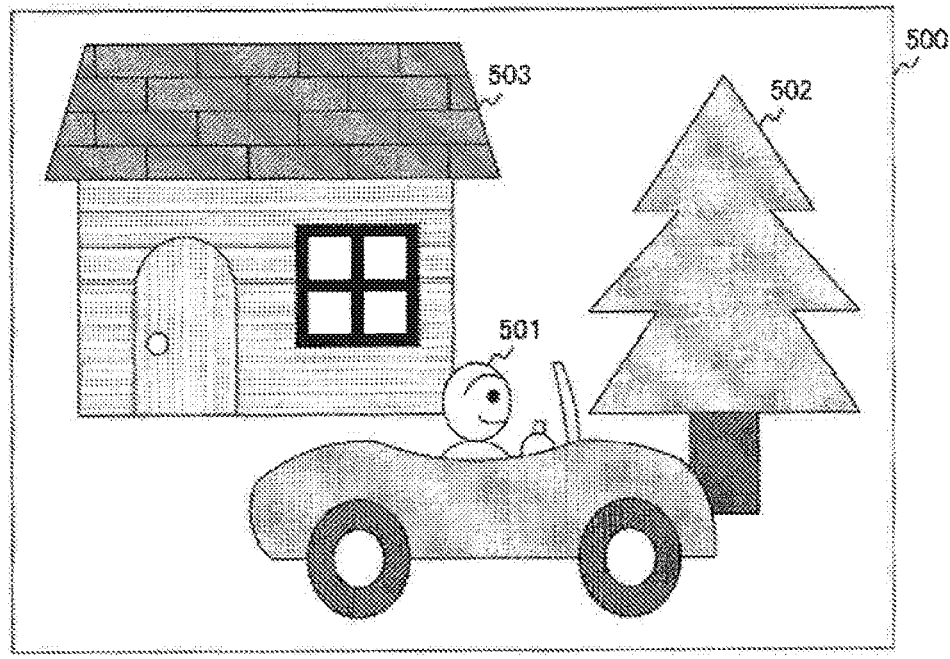
(a) IMAGE DATA
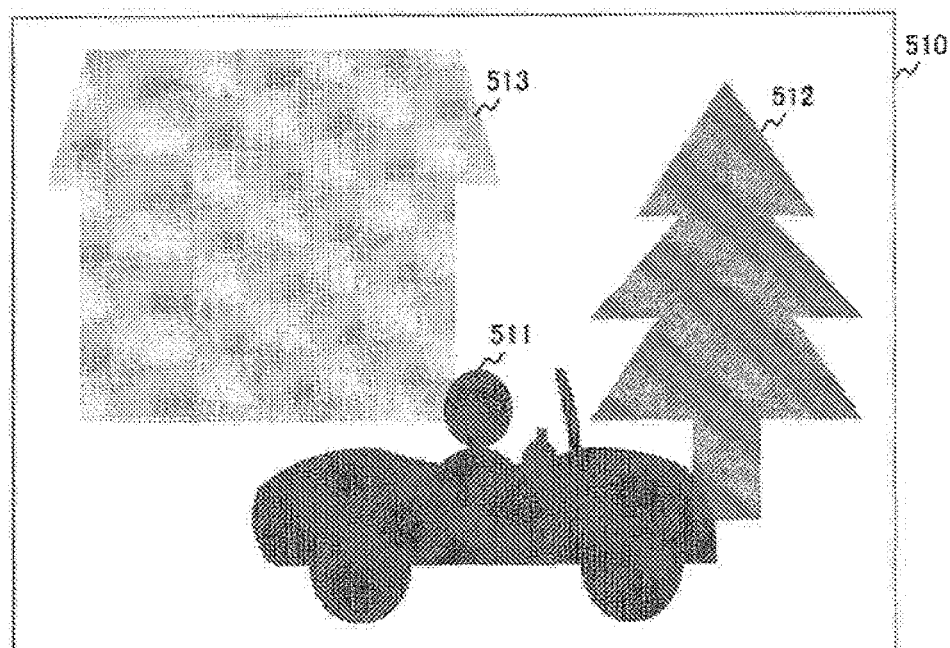
(b) DEPTH INFORMATION

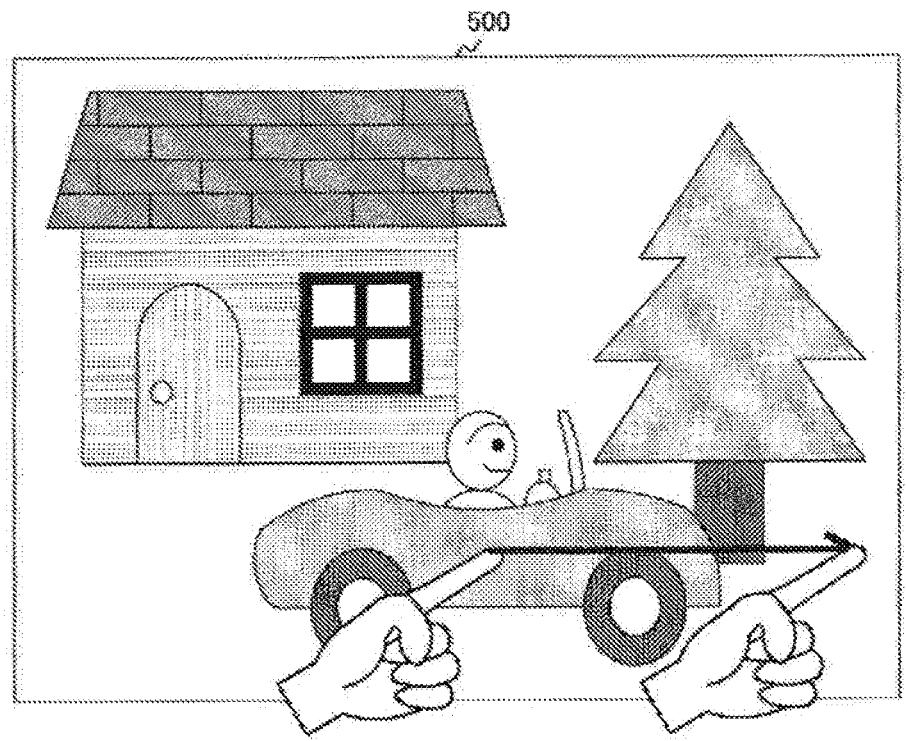

FIG.6
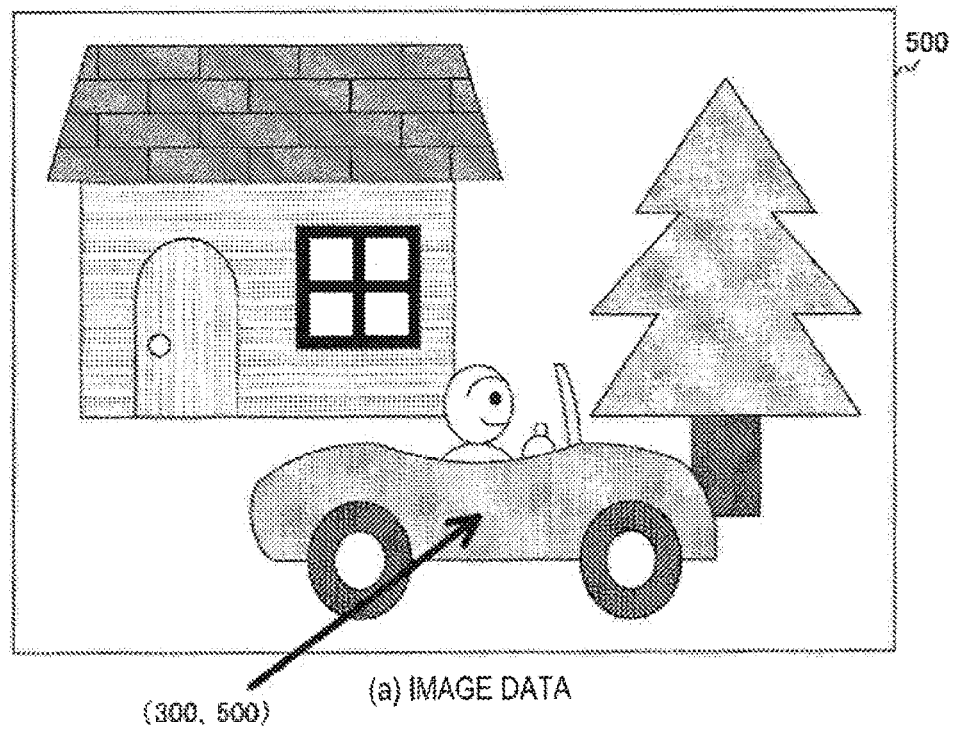
(300, 500)   (a) IMAGE DATA
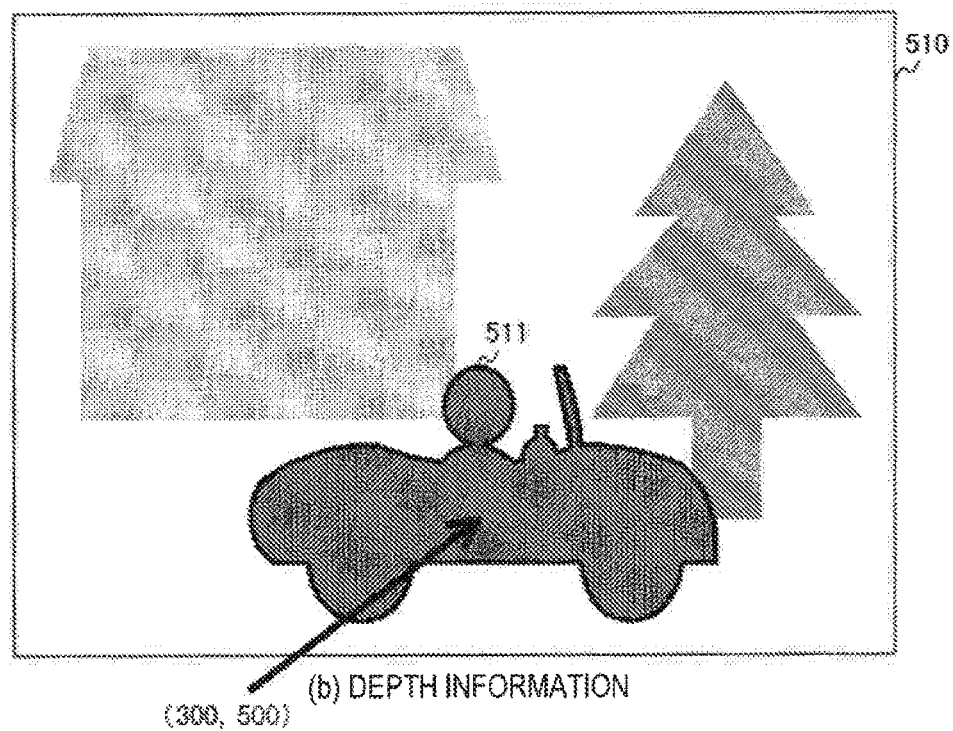
(300, 500)   (b) DEPTH INFORMATION

FIG.7

| COORDINATES | DEPTH [m] | FILTER ORDER |
|---|---|---|
| (0, 0) | 20 | 3 |
| (1, 0) | 20 | 3 |
| ⋮ | ⋮ | ⋮ |
| (200, 100) | 10 | 6 |
| (201, 100) | 10 | 6 |
| ⋮ | ⋮ | ⋮ |
| (300, 500) | 5 | 1 |
| (301, 500) | 5 | 1 |
| ⋮ | ⋮ | ⋮ |

FIG.9
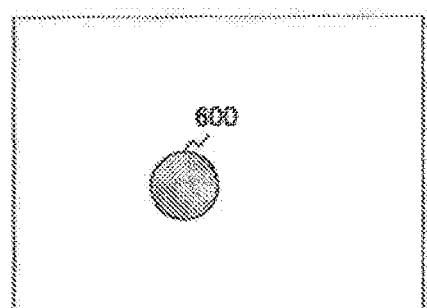
(a)
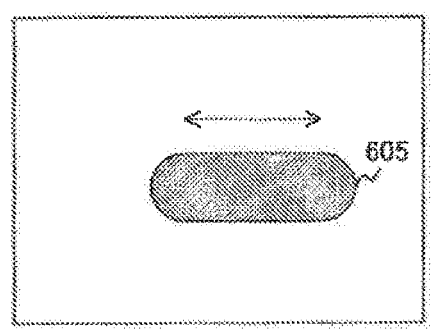
(b)
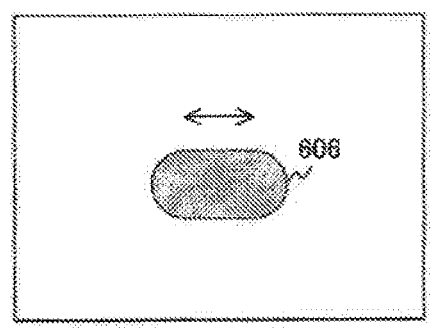
(c)

FIG.11
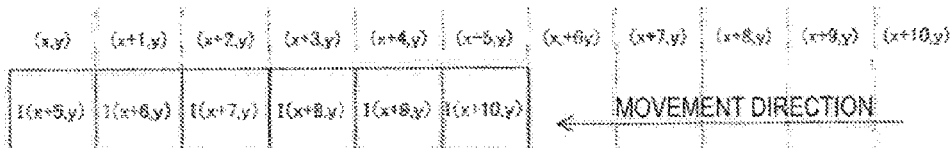
(a) IMAGE AT TIME POINT T0
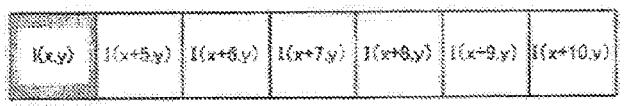
(b) IMAGE AT TIME POINT T1
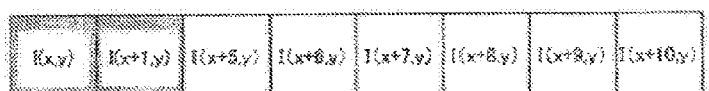
(c) IMAGE AT TIME POINT T2
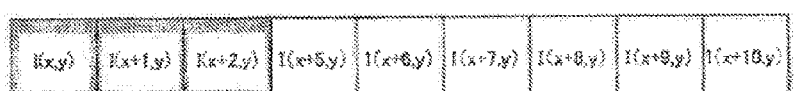
(d) IMAGE AT TIME POINT T3
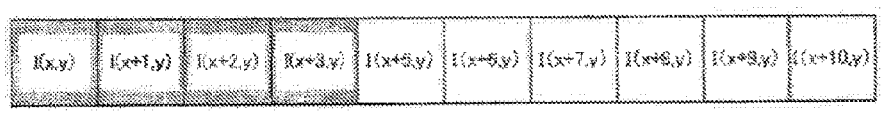
(e) IMAGE AT TIME POINT T4
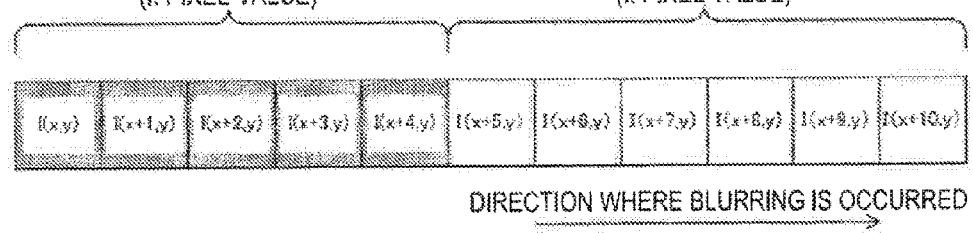
(f) IMAGE AT TIME POINT T5

FIG.12
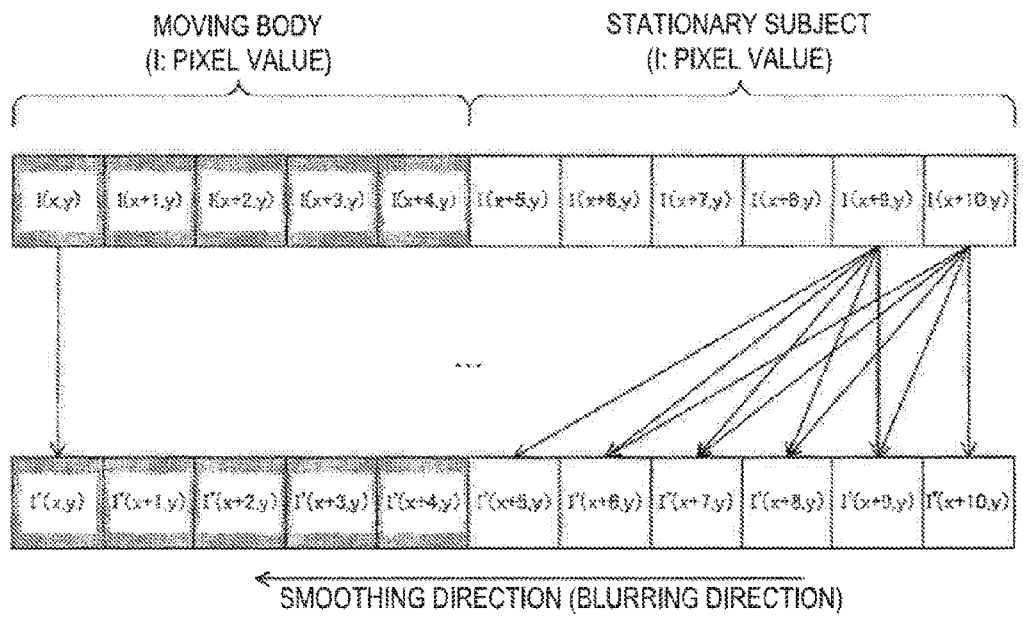
(a)
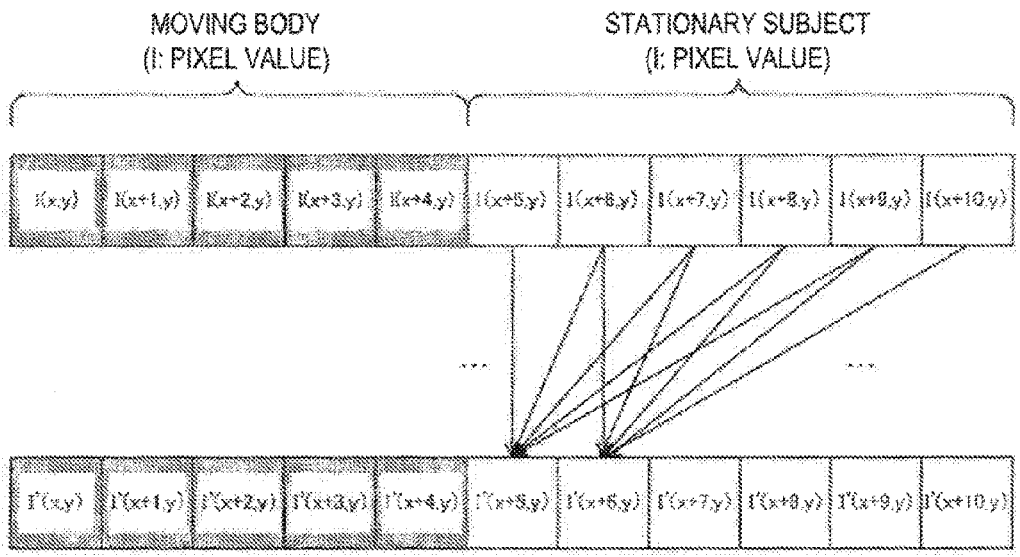
(b)

IMAGE PROCESSING DEVICE, METHOD OF CONTROLLING IMAGE PROCESSING DEVICE, AND PROGRAM FOR CAUSING COMPUTER TO EXECUTE THE SAME METHOD

CROSS REFERENCE TO PRIOR APPLICATION

This application is a continuation of U.S. patent application Ser. No. 13/485,171 (filed on May 31, 2012), which claims priority to Japanese Patent Application No. 2011-127098 (filed on Jun. 7, 2011), which are all hereby incorporated by reference in their entirety.

BACKGROUND

The present disclosure relates to an image processing device, a method of controlling the image processing device, and a program for causing a computer to execute the method. More particularly, the present disclosure relates to an image processing device for performing a smoothing process, a method of controlling the image processing device, and a program for causing a computer to execute the method.

In recent years, an imaging method called panning has been widely used for capturing a moving subject. The panning is a method for photographing an image where a moving subject is clearly captured and a stationary subject such as a background is blurred along a moving direction. This image is hereinafter referred to as a "panning image". The panning gives a vivid representation to a moving subject.

The panning is performed by an operation in which a photographer moves an imaging apparatus to follow the movement of a subject in a state where a shutter speed is set to be slower than a normal speed. In order to appropriately perform the setting of the shutter speed or the movement of the imaging apparatus, it is necessary for a photographer to have a relatively high skill, and thus a completed state of the panning image greatly depends on a skill of the individual photographer.

Therefore, there has been proposed an imaging apparatus which measures a movement speed of a subject when detecting a motion of the imaging apparatus by a photographer and controls a shutter speed in response to the movement speed (for example, see Patent Application Laid-open Publication No. 2009-229732). The imaging apparatus enables a shutter speed to be set appropriately and thus the capturing of a panning image is easily performed.

SUMMARY

However, in the above-described related art, generating a panning image from a normal image captured without using a panning technique has been not achieved. It is expected that the imaging apparatus disclosed in Patent Application Laid-open Publication No. 2009-229732 assists the panning through the adjustment of the shutter speed, but a movement of the imaging apparatus is performed by the photographer himself/herself. For this reason, even in the imaging apparatus disclosed in Patent Application Laid-open Publication No. 2009-229732, a completed state of the panning image still has depended on a photographer's skill in regard to settings other than the shutter speed.

It is desirable to provide a technique for generating a panning image without depending on a photographer's skill.

According to an embodiment of the present disclosure, there is provided an image processing device including a depth acquisition unit for acquiring a depth to a subject in correlation with a pixel in a captured image of the subject, and a smoothing processing unit for designating a pixel in a region excluding a predetermined region in the image as a target pixel and for performing a smoothing process of the degree according to the depth corresponding to the target pixel for a pixel value of the target pixel in a predetermined direction. There is also provided a method of controlling the image processing device and a program for causing a computer to execute the method. This allows the smoothing process of the degree depending on the depth to be performed for the pixel value of the target pixel in a predetermined direction.

According to the first embodiment, the smoothing processing unit may include a smoothing parameter setting section for setting smoothing parameters indicating characteristics of the smoothing process, and may include a smoothing process performing section for performing the smoothing process on the basis of the set smoothing parameters and the acquired depth. This allows the smoothing process to perform based on the smoothing parameters and the depth.

In addition, according to the first embodiment, the smoothing process performing section may include a calculation part for calculating the degree of the smoothing process on the basis of the amount prescribed in the smoothing parameters and the acquired depth, and may include a smoothing filter for performing the calculated degree of the smoothing process. This allows the degree to be calculated based on the amounts prescribed in the smoothing parameters and the depth According to the first embodiment, the smoothing parameter setting section may sets the smoothing parameters including a direction in which the smoothing process is performed as the predetermined direction, and the smoothing process performing section performs the smoothing process in the set direction on the basis of the acquired depth. This allows the smoothing process to be performed in the set direction.

In addition, according to the first embodiment, the smoothing parameter setting section may set the smoothing parameters including information indicating a region for which the smoothing process is not performed as the predetermined region, and the smoothing process performing section may designate a pixel in a region excluding the set region as a target pixel and perform the smoothing process on the basis of the acquired depth. This allows a pixel in a region excluding the set region to be designated as a target pixel, and the smoothing process is performed.

According to the first embodiment, the smoothing parameter setting section may set the smoothing parameters including information indicating one or more pixels in the predetermined region, and the smoothing process performing section may include a region detection part for detecting a region including the pixels related to the depths where a difference with the depths corresponding to the one or more pixels is equal to or smaller than a predetermined value, and may include a smoothing filter for designating a pixel in a region excluding the detected region as the target pixel and for performing the smoothing process on the basis of the acquired depth. This allows a pixel in a region excluding the region where a difference between the depths is within a predetermined value to be designated as a target pixel, and the smoothing process is performed.

In addition, according to the first embodiment, the smoothing processing unit may perform the smoothing process using a moving average filter. This allows the smoothing process to be performed by the moving average filter.

According to the first embodiment, the smoothing processing unit may perform the smoothing process using a Gaussian filter. This allows the smoothing process to be performed by the Gaussian filter.

In addition, according to the first embodiment, the image may include a criterion image regarded as a criterion and a reference image referred to when the depth is generated. The depth acquisition unit may include a parallax detection section for detecting a distance between any one pixel in the criterion image and a pixel in the reference image corresponding to the pixel as a parallax and may include a depth generation section for generating the depth in correlation with the pixel in the criterion image on the basis of the detected parallax. The smoothing processing unit may designate a pixel in a region excluding the predetermined region in the criterion image as the target pixel and performs the smoothing process. This allows a depth to be generated on the basis of the detected parallax.

According to the present disclosure, it is possible to achieve an excellent effect that a panning image can be generated from a normal image.

BRIEF DESCRIPTION OF THE DRAWINGS

FIG. 3 is a diagram illustrating an example of image data and depth information according to the first embodiment;

FIG. 4 is a diagram illustrating an example of a method for setting smoothing parameters according to the first embodiment;

FIG. 5 is a diagram illustrating an example of the smoothing parameters according to the first embodiment;

FIG. 6 is a diagram illustrating an example of a method for detecting a moving body region according to the first embodiment;

FIG. 7 is a diagram illustrating an example of a filter order according to the first embodiment;

FIG. 9 is a diagram illustrating an example of the subject which is smoothed according to the filter order according to the first embodiment;

FIG. 11 is a diagram illustrating an example of the image on which panning is performed according to the first embodiment;

FIG. 12 is a diagram illustrating an example of the image before and after the smoothing process is performed according to the first embodiment;

DETAILED DESCRIPTION OF THE EMBODIMENT(S)

Figure 1:
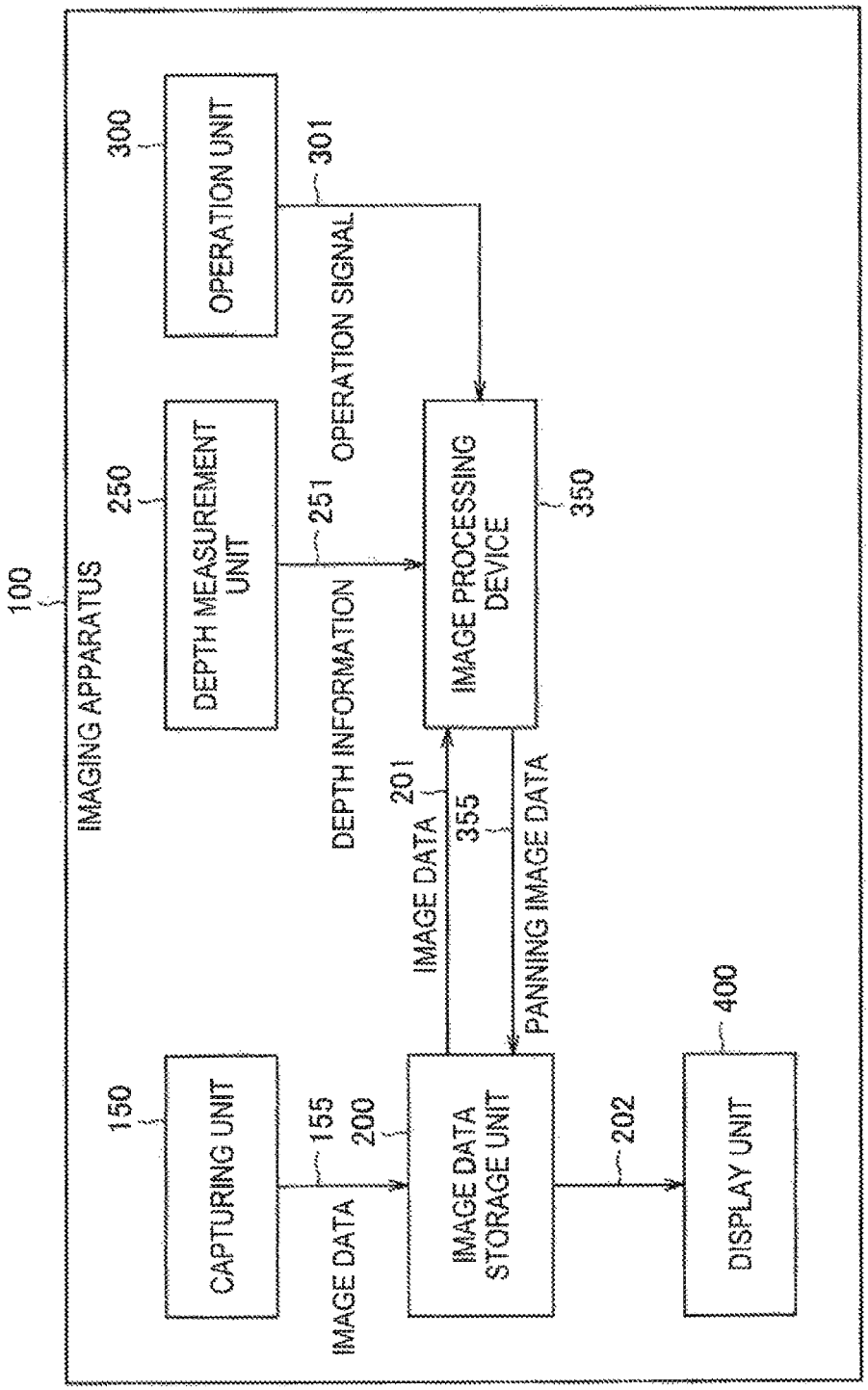
FIG. 1 is a block diagram illustrating a configuration example of an imaging apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described. The description will be made in the following order.

1. First Embodiment (image processing: an example of generating a panning image)

2. Second Embodiment (image processing: an example of using stereo matching method)

1. First Embodiment

Configuration Example of Imaging Apparatus

FIG. 1 is a block diagram illustrating a configuration example of an imaging apparatus 100 according to the first embodiment of the present disclosure. The imaging apparatus 100 captures a subject and generates a panning image from the captured image of the subject. The imaging apparatus 100 includes a capturing unit 150, an image data storage unit 200, a depth measurement unit 250, an operation unit 300, an image processing device 350, and a display unit 400.

The capturing unit 150 captures a subject and generates image data. The capturing unit 150 provides the generated image data to the image data storage unit 200 via a signal line 155.

The image data storage unit 200 stores image data. The image data storage unit 200 stores image data each generated by the capturing unit 150 and the image processing device 350.

The depth measurement unit 250 measures a depth to the subject. For example, the depth measurement unit 250 irradiates a laser light onto the subject in synchronization with the image captured by the capturing unit 150, detects a light reflected from the subject, and measures the depth based on a delay time ranging from an irradiation time point to a detection time point. The depth measurement unit 250 measures depths in correlation with the respective pixels in an image, and generates depth information indicating such depths. The depth measurement unit 250 provides the generated depth information to the image processing device 350 via a signal line 251.

The operation unit 300 detects an operation signal for operating the imaging apparatus 100. The operation signal includes an operation signal for setting smoothing parameters. The smoothing parameters will be described later. The operation unit 300 provides the detected operation signal to the image processing device 350 via a signal line 301.

The image processing device 350 performs a smoothing process for image data to generate panning image data. More specifically, the image processing device 350 sets smoothing parameters in response to the operation signal.

The smoothing parameters are parameters indicating characteristics of the smoothing process, and include the values of a moving body position, a movement direction and a movement amount. The smoothing process will be described later in detail. The moving body position corresponds to coordinates of any pixel within a region where a subject is captured, and the subject is intended to be viewed as the subject is moving among subjects in an image. Hereinafter, the region where the moving body is captured will be referred to as a "moving body region". The movement direction is set as a movement direction of the moving body, and a direction reverse to the movement direction is a direction of the smoothing process. The movement amount is an amount prescribed as a moved distance for exposure time of the moving body.

After setting the smoothing parameters, the image processing device 350 calculates a degree of smoothing on the basis of a movement amount and a depth corresponding to a pixel, in a region other than the moving body region. For example, the image processing device 350 calculates the degree of smoothing from the following Expression (1).

$$B = A \times S/D \quad (1)$$

In Expression (1), "B" denotes the degree of smoothing such as a filter order of a smoothing filter. An amount of blur is increased or decreased depending on the order of the smoothing filter. In addition, "S" denotes a movement amount, and the unit thereof is [m] or the like. "D" denotes a depth, and the unit thereof is [m] or the like. "A" denotes a coefficient for converting a value of S/D into B. In addition, the image processing device 350 calculates the filter order B (amount of blur) in a case where the imaging apparatus 100 is moved in parallel with the movement direction of the moving body according to Expression (1). Alternatively, the image processing device 350 may calculate an amount of blur in a case where the imaging apparatus 100 is rotated. An amount of blur when rotating the imaging apparatus 100 to follow the movement of the moving body is calculated from not the depth but the movement amount. An amount of blur in this case is calculated, for example, using an expression $B = A \times S$ instead of Expression (1).

The image processing device 350 performs the smoothing process for pixel values of pixels in a region other than the moving body region in a direction reverse to the movement direction on the basis of the calculated filter order. The image processing device 350 provides the image data on which the smoothing process is performed to the image data storage unit 200 as panning image data via a signal line 355.

The display unit 400 displays the image data or the panning image data read out from the image data storage unit 200.

[Configuration Example of Imaging Processing Device]

Figure 2:
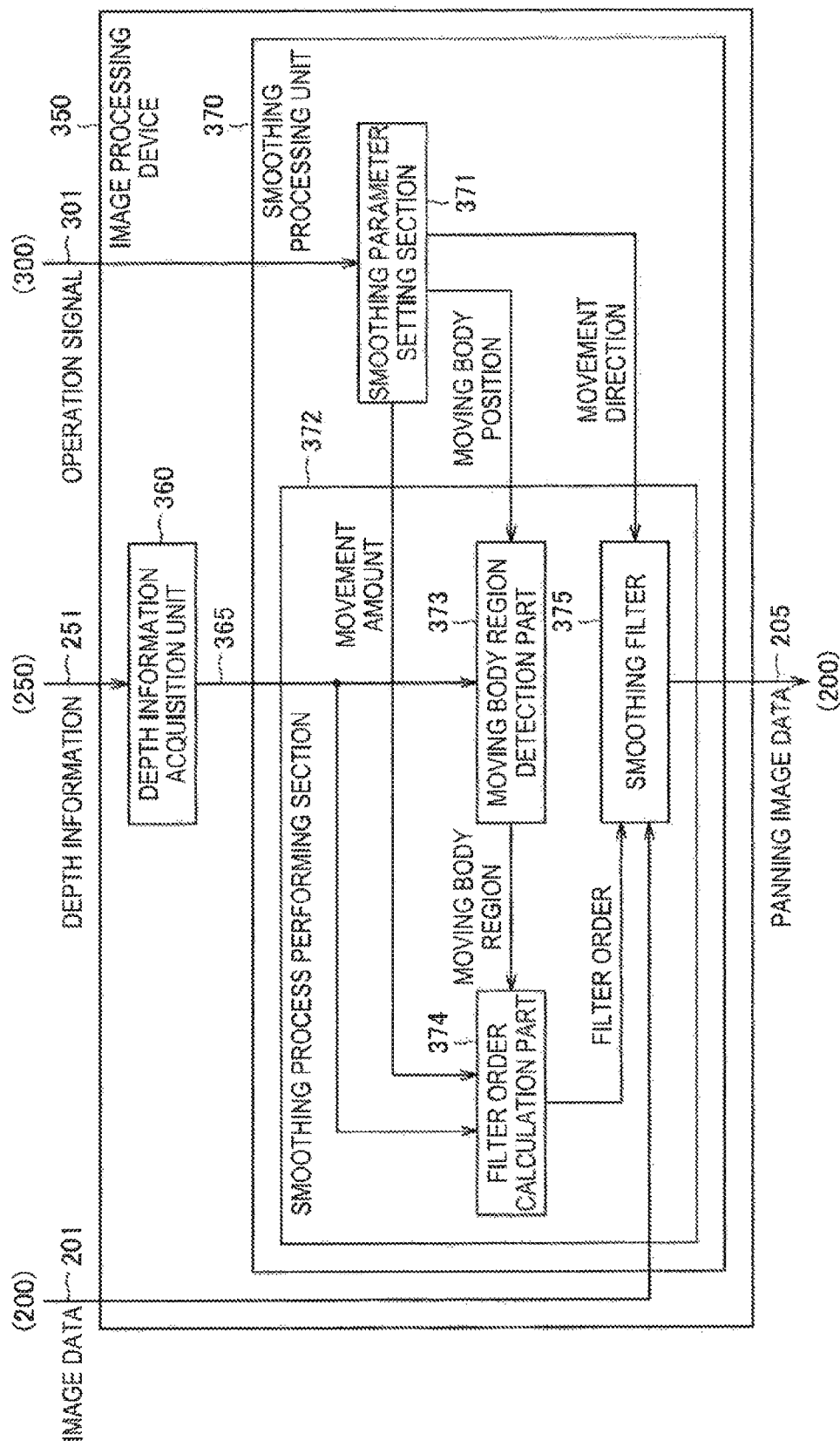
FIG. 2 is a block diagram illustrating a configuration example of an image processing device according to the first embodiment.

FIG. 2 is a block diagram illustrating a configuration example of the image processing device 350 according to the first embodiment. The image processing device 350 includes a depth information acquisition unit 360 and a smoothing processing unit 370.

The depth information acquisition unit 360 acquires depth information generated by the depth measurement unit 250. The depth information acquisition unit 360 provides the acquired depth information to the smoothing processing unit 370 via a signal line 365.

The smoothing processing unit 370 performs smoothing process for the image data on the basis of the depth information. The smoothing processing unit 370 includes a smoothing parameter setting section 371 and a smoothing process performing section 372.

The smoothing parameter setting section 371 sets smoothing parameters in response to an operation signal. The smoothing parameter setting section 371 provides the set smoothing parameters to the smoothing process performing section 372.

The smoothing process performing section 372 performs the smoothing process based on the smoothing parameters and the depth information. The smoothing process performing section 372 includes a moving body region detection part 373, a filter order calculation part 374, and a smoothing filter 375.

The moving body region detection part 373 detects a moving body region. More specifically, the moving body region detection part 373 acquires a depth corresponding to the moving body position included in the smoothing parameters as depth information. And then, the moving body region detection part 373 detects a region formed by pixels of which depths where a difference with the depth thereof is within a predetermined value are measured, as the moving body region. The moving body region detection part 373 generates moving body region information indicating the detected moving body region. The moving body region information includes information indicating, for example, a pixel group of the contour of the moving body region. The moving body region detection part 373 provides the generated moving body region information to the filter order calculation part 374.

The filter order calculation part 374 calculates a filter order for a region excluding the moving body region based on the depth information and the movement amount. More specifically, the filter order calculation part 374 designates the regions other than the moving body region detected by the moving body region detection part 373, as target pixels which are targets of the smoothing process. The filter order calculation part 374 calculates the filter order "B" for each target pixel from the movement amount "S" included in the smoothing parameters and the depth "D" corresponding to each target pixel, using Expression (1). Since the pixels in the moving body region are not targets of the smoothing process, filter orders of the pixels in the moving body region are set to "1". In addition, in a case where a calculated filter order is smaller than "1", the filter order is set to "1". The filter order calculation part 374 provides the filter orders for each pixel to the smoothing filter 375.

The smoothing filter 375 performs the smoothing process for the target pixels according to the filter orders. The smoothing filter 375 is a simple moving average filter which performs smoothing using, for example, a simple moving average method.

With the simple moving average method, first, the smoothing filter 375 initializes a pixel value I'(i,j) after being smoothed and a normalization coefficient n(i,j), for all the pixels in the image. For example, all the values are initialized to 0. In this regard, i is a horizontal coordinate of the pixel, and j is a vertical coordinate of the pixel. If the number of pixels in the horizontal direction of the image is W and the number of pixels in the vertical direction is H, then i is an integer of 0 to W−1 and j is an integer of 0 to H−1. In addition, the normalization coefficient is a coefficient which is multiplied when normalization is performed. Details of the normalization will be described later.

After the initialization, the smoothing filter 375 focuses on any pixel in the image and designates the pixel as a pixel of interest. The smoothing filter 375 acquires a pixel value I(i,j) and a filter order B(i,j) of the pixel of interest. The smoothing filter 375 determines whether or not there is a pixel in the moving body region among B(i,j) pixels which are continuously located in a smoothing process direction from the pixel of interest. If there is a pixel in the moving body region, then the smoothing filter 375 determines whether or not the depth of the pixel of interest is larger than the depth of the pixel in the moving body region (that is, a subject of the pixel of interest is located further inside than the moving body). If the depth of the pixel of interest is larger than the depth of the pixel in the moving body region, then the smoothing filter 375 does not add I(i,j)/B(i,j) to the pixel value after being smoothed of the pixel.

On the other hand, if there is no pixel in the moving body region among the B(i,j) pixels, or the depth of the pixel of interest is equal to or smaller than the depth of the pixel in the moving body region, the smoothing filter 375 adds I(i,j)/B(i,j) to the pixel values after being smoothed of the B(i,j) pixels. However, the smoothing filter 375 may add I(i,j)/B(i,j) to the pixel values after being smoothed of the B(i,j) pixels, regardless of whether or not there is a pixel in the moving body region among the B(i,j) pixels and whether or not the moving body is located at more front side than the subject. A calculation amount is reduced in the configuration where the addition is performed in both cases. For example, in a case where a direction of the normalization process is an −X direction and there is no pixel in the moving body region among the group of B(i,j) pixels, calculations according to the following Expression (2) are performed for the pixel of interest.

$$\begin{cases} I'(i-B_{ij}+1,\ j)\ +=\ I_{ij}/B_{ij} \\ I'(i-B_{ij}+2,\ j)\ +=\ I_{ij}/B_{ij} \\ \vdots \\ I'(i,\ j)\ +=\ I_{ij}/B_{ij} \end{cases} \qquad (2)$$

In Expression (2), the symbol "+=" indicates a calculation where a value on the right side is added to that on the left side. In addition, I(i,j) and B(i,j) are denoted for short by Iij and Bij, respectively.

Next, in a case where there is no pixel in the moving body region among B(i,j) pixels which are continuously located in the smoothing, process direction from the pixel of interest, or the depth of the pixel of interest is equal to or smaller than the depth of the pixel in the moving body region even if there is the pixel in the moving body region, the smoothing filter 375 adds I/B(i,j) to the normalization coefficient. In a case where there is a pixel in the moving body region among B(i,j) pixels and the depth of the pixel of interest is larger than the depth of the pixel in the moving body region, the smoothing filter 375 does not add I/B(i,j) to the normalization coefficient of the pixel. For example, in a case where a direction of the normalization process is the −X direction and there is no pixel in the moving body region among the group of B(i,j) pixels, calculations according to the following Expression (3) are performed for the pixel of interest.

$$\begin{cases} n(i-B_{ij}+1,\ j)\ +=\ 1/B_{ij} \\ n(i-B_{ij}+2,\ j)\ +=\ 1/B_{ij} \\ \vdots \\ n(i,\ j)\ +=\ 1/B_{ij} \end{cases} \qquad (3)$$

The smoothing filter 375 sequentially designates each of all the pixels in the image as a pixel of interest and performs calculations according to Expressions (2) and (3). As a result of the calculations, it is assumed that (pixel value after being smoothed)/(filter order) of K pixels continuously located in the X direction from a certain pixel of interest is added to a pixel value I'(i,j) after the pixel of interest is smoothed. In this case, a pixel value after being smoothed is calculated as exemplified in the following Expression (4).

$$I'(i,\ j)=\sum_{k=1}^{k=K}\left\{\frac{I(i+k-1,\ j)}{B(i+k-1,\ j)}\right\} \qquad (4)$$

In addition, in a case where 1/(filter order) of K pixels continuously located in the X direction from a certain pixel is added to a normalization coefficient n(i,j) of the pixel, a normalization coefficient is calculated as exemplified in the following Expression (5).

$$n(i,\ j)=\sum_{k=1}^{k=K}\left\{\frac{1}{B(i+k+1,\ j)}\right\} \qquad (5)$$

In addition, although Expressions (4) and (5) are applied to a case where a direction of the smoothing is the −X direction, if a direction of the smoothing is the X direction, then (i+k−1,j) may be simply replaced with (i−k+1,j) in Expressions (4) and (5). In addition, in a case where a direction of the smoothing is the −Y direction, (i+k−1,j) is replaced with (i,j+k−1). In a case where a direction of the smoothing is the Y direction, (i+k−1,j) is replaced with (i,j−k+1).

In Expression (4), if a value of K which is the number of times being added is consistent with a value of the denominator, then an average value of output values of K pixels is calculated, but there may be a case where the number of times being added is not consistent with a value of the denominator. For example, this corresponds to a case where filter orders of five pixels (i,j) to (i+4,j) are all "6" and a filter order of the sixth pixel (i+5,j) is "5". In this case, although values corresponding to five pixels of pixels (i,j) to (i+4,j) are added to I'(i,j) on the basis of Expression 2, the sixth value I'(i+5,j) is not added to I'(i,j). For this reason, "5" which is the number of times being added is not consistent with "6" which is value of the denominator. Therefore, calculations according to the following Expression (6) are performed. Hereinafter, performing calculations according to the following Expression (6) is referred to as "normalization".

$$I'(i,j)=I'(i,j)/n(i,j) \qquad (6)$$

Through the normalization, an average value of K pixel values, that is, I'(i,j) can be obtained. For example, in a case where filter orders of the pixels (i,j) to (i+4,j) are all "6" and a filter order of the pixel (i+5,j) is "5", "5/6" is calculated as a value of n(i,j) on the basis of Expression (3). At this time, through the calculation according to Expression (6), the denominator of I(i,j) becomes "5", which thus is consistent with the number of times being added.

The smoothing filter 375 provides the image data on which above-described smoothing process is performed to the image data storage unit 200 as a panning image data.

In addition, the depth information acquisition unit 360 is an example of the depth acquisition unit recited in the claim. The filter order calculation part 374 is an example of the calculation part recited in the claim. Further, the moving body region detection part 373 is an example of the region detection part recited in the claim.

FIG. 3 is a diagram illustrating an example of the image data and the depth information according to the first embodiment. FIG. 3(a) illustrates an example of the image data 500 which is input to the image processing device 350. The image data 500 includes, for example, a subject 501 containing a car and driver, a tree subject 502, and a house subject 503. For example, the subject 501 is set as a moving body by a user.

FIG. 3(b) is a diagram illustrating an example of the depth information 510 acquired in synchronization with the image data 500. The depth information 510 is data which corresponds to the image data 500 and indicates a depth of a subject with a pixel value by correlating with each pixel. For example, in the depth information 510, a luminance value is set as a pixel value indicating the depth, and the luminance value is set lower as the depth becomes smaller. The depth information 510 includes subjects 511, 512 and 513 which respectively correspond to the subjects 501, 502 and 503 in the image data 500. In this regard, it is assumed that the depth of the subject 511 is the smallest of the subjects 511, 512 and 513, and a background. Also, it is assumed that their depths are increased in the order of the subject 512, the subject 513, and the background. In this case, the luminance value of the foremost subject 511 is set to be lowest in the depth information 510. The luminance values are set to be increased in the order of the subject 512, the subject 513 and the background according to the respective depths of them. Alternatively, in the depth information 510, the smaller the depth is, the higher the luminance value may be set to be.

FIG. 4 is an explanatory diagram illustrating an example of a method for setting smoothing parameters according to the first embodiment. For example, the imaging apparatus 100 displays the image data 500 on the touch panel and starts to receive an operation of a user. When the user designates any one pixel in the image data 500 with its finger or the like, the imaging apparatus 100 sets a position of the pixel as a moving body position in the smoothing parameters. Next, when the user drags its finger or the like from the moving body position toward any one pixel in the image, the imaging apparatus 100 sets a direction from the moving body position to a position of the end point of the drag operation as a movement direction in the smoothing parameters. In addition, the imaging apparatus 100 sets a distance from the moving body position to the end point as a movement amount of the smoothing parameter. As such, the user inputs the moving body position, movement direction and movement amount, and thus the user can arbitrarily set a region for which the smoothing process is not performed, a direction of the smoothing process, and an amount of blur.

FIG. 5 is a diagram illustrating an example of the smoothing parameters according to the first embodiment. The smoothing parameters include, for example, a motion vector and a moving body position. The motion vector indicates a movement direction and a movement amount. For example, in a case where a drag operation is performed in a direction from coordinates (300,500) of the start point to coordinates (360,500) of the end point, the coordinates (300,500) or the start point is set as the moving body position, and the vector (+60,0) from the start point to the end point is set as the motion vector.

FIG. 6 is an explanatory diagram illustrating an example of a method for detecting the moving body region according to the first embodiment. FIG. 6(a) is a diagram illustrating an example of the image data 500 where a moving body position is designated. FIG. 6(b) is a diagram illustrating an example of the depth information 510 where a moving body region is detected. As shown in FIG. 6(a), when the moving body position (300,500) is set, the image processing device 350 acquires a depth Dt correlated with the moving body position by referring to the depth information. In addition, the image processing device 350 detects a pixel group related to the depth within a range of Dt±α as the moving body region. Where α is a value allowed as a difference with the depth Dt. The image processing device 350 generates information indicating a contour of the detected moving body region as the moving body region. For example, as shown in FIG. 6(b), when a region of the subject 511 including the moving body position is detected as the moving body region, information indicating pixels of the contour part (that is, the part drawn in a bold line) of the subject 511 is generated as moving body region information.

FIG. 7 is a diagram illustrating an example of the calculated filter order according to the first embodiment. For example, it is assumed that the depth 20[m] is acquired in correlation with the coordinates (0,0) and (1,0), and the depth 10[m] is acquired in correlation with the coordinates (200,100) and (201,100). In addition, it is assumed that the depth 5[m] is acquired in correlation with the coordinates (300,500) and (301,500) in the moving body region. It is assumed that the movement amount is 60[m], and the coefficient A in Expression (1) is 1. In this case, the filter order "3" is calculated from Expression (1) in relation to the coordinates (0,0) and (1,0). In addition, the filter order "6" is calculated from Expression (1) in relation to the coordinates (220,100) and (201,100). Since the coordinates (300, 500) and (301,500) in the moving body region are not targets of the smoothing process, Expression (1) is not applied thereto, and the filter order thereof is "1". As such, in the regions excluding the moving body region, the larger the depth is, the lower the filter order is set to be. As a result, the larger the depth is, the smaller the amount of blur is.

Figure 8:
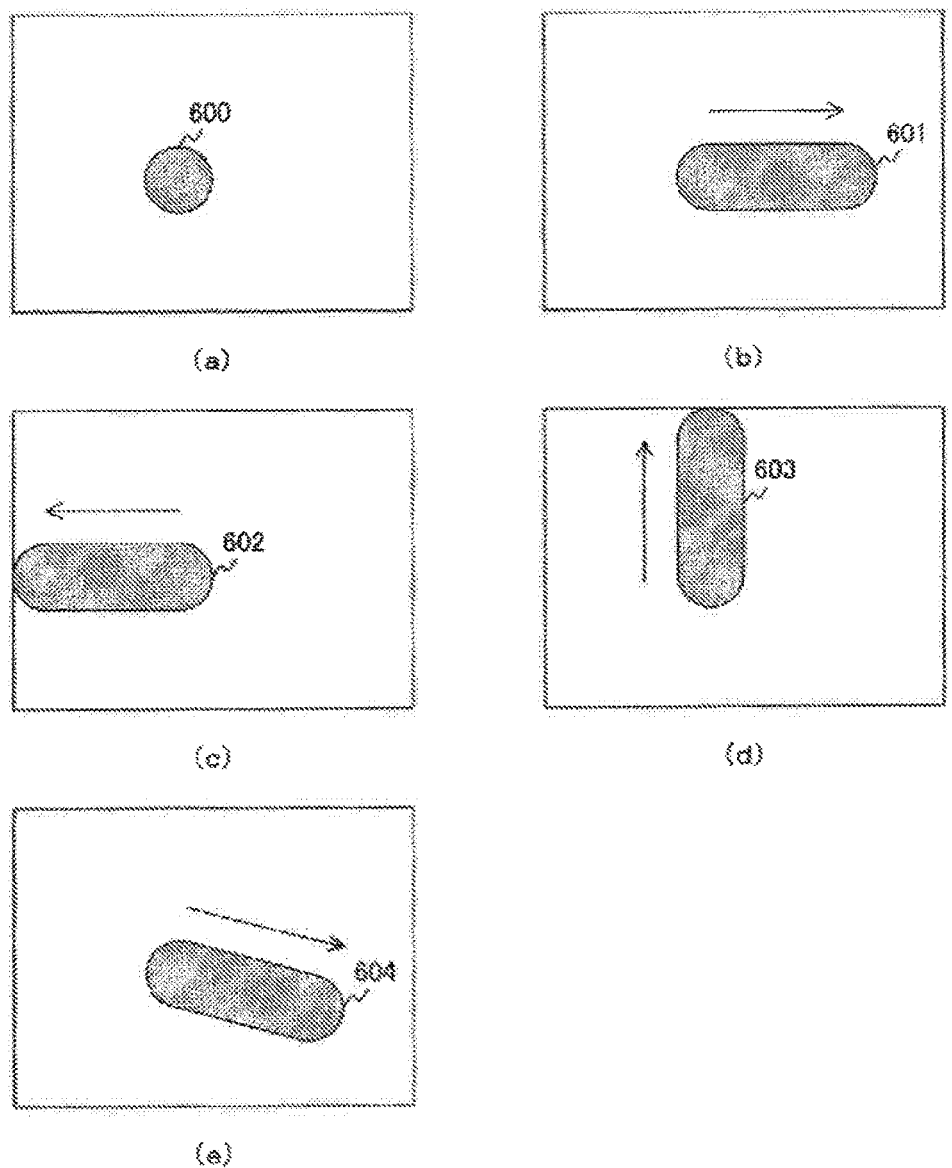
FIG. 8 is a diagram illustrating an example of a subject which is smoothed based on a movement direction according to the first embodiment.

FIG. 8 is a diagram illustrating an example of the subject which is smoothed (that is, blurred) on the basis of the movement direction according to the first embodiment. FIG. 8(a) shows an example of the subject 600 before being smoothed. FIG. 8(b) shows an example of the subject 601 which is smoothed when the left direction is set as a movement direction. In this case, the subject 600 is smoothed in the right direction. FIG. 8(c) shows an example of the subject 602 which is smoothed when the right direction is set as a movement direction. In this case, the subject 600 is smoothed in the left direction. FIG. 8(d) shows an example of the subject 603 which is smoothed when the downward direction is set as a movement direction. In this case, the subject 600 is smoothed in the upward direction. FIG. 8(e) shows an example of the subject 604 which is smoothed when the upper left direction is set as a movement direction. In this case, the subject 600 is smoothed in the lower right direction. As shown in FIGS. 8(*b*) to 8(*e*), the subject is smoothed in a reverse direction to a movement direction.

FIG. 9 is an example of the subject which is smoothed according to the filter order in accordance with the first embodiment. FIG. 9(*a*) shows an example of the subject 600 before being smoothed. FIG. 9(*b*) shows an example of the subject 605 which is smoothed according to the filler order "6". FIG. 9(*c*) shows an example of the subject 606 which is smoothed according to the filter order "3". As shown in FIGS. 9(*b*) and 9(*c*), the amount of blur of the subject 605 having the higher filter order is larger than the amount of blur of the subject 606 having the lower filter order.

Figure 10:
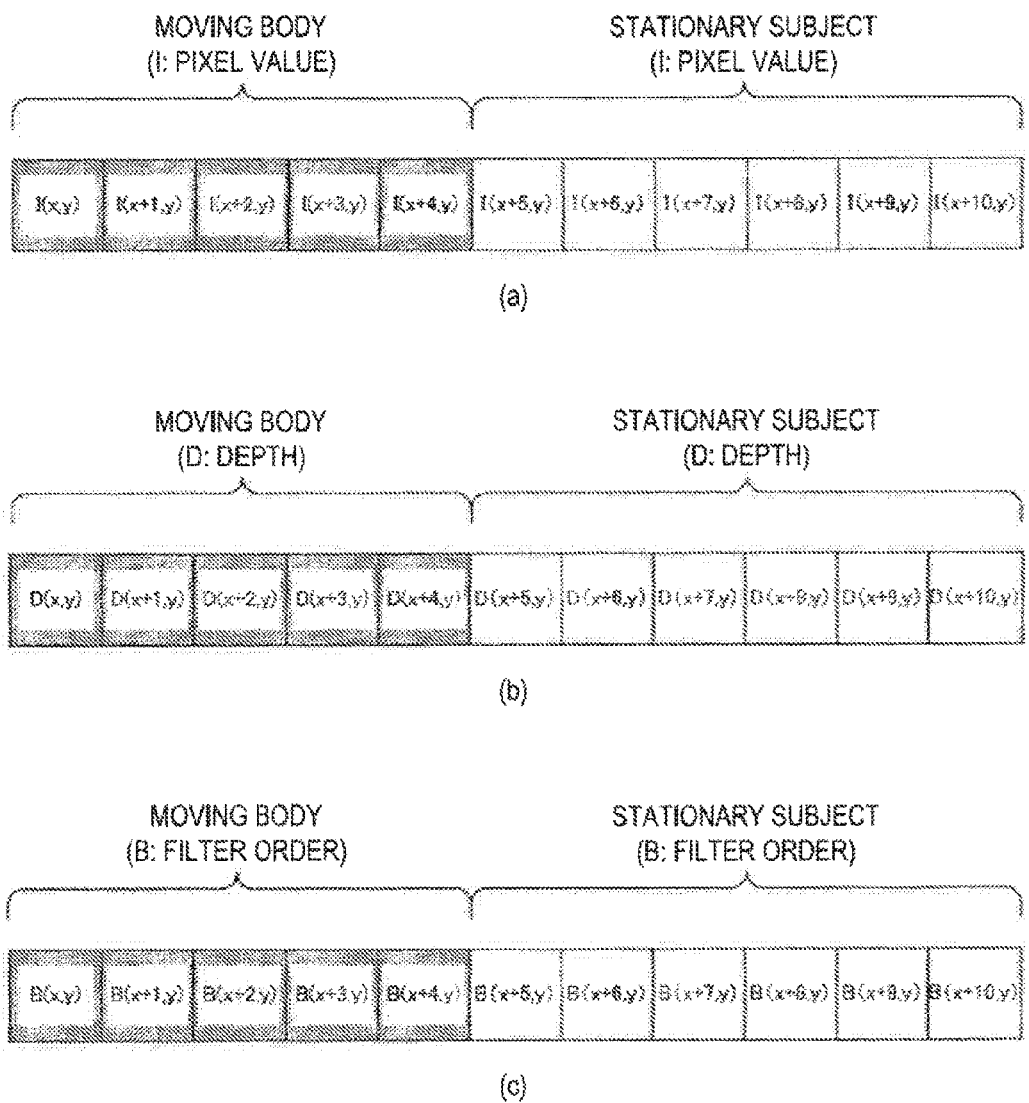
FIG. 10 is a diagram illustrating an example of a pixel value, depth, and filter order according to the first embodiment.

FIG. 10 is a diagram illustrating an example of the pixel value, the depth, and the filter order according to the first embodiment. FIG. 10(*a*) is a diagram illustrating an example of the pixel values in a portion of pixel groups in the image data. Pixel values in eleven pixels of coordinates (x,y) to (x–10,y) in the image are set to I(x,y) to I(x+10,y), respectively. Among them, I(x,y) to I(x+4,y) are pixel values of a pixel group in a moving body region, and I(x+5,y) to I(+10,y) are pixel values in a region of a stationary subject.

FIG. 10(*b*) is a diagram illustrating an example of the depth in the depth information. The depths D(x,y) to D(x+10,y) are acquired by being correlated with the coordinates (x,y) to (x+10,y) in the image. FIG. 10(*c*) is a diagram illustrating an example of the set filter order. The filter order B(x,y) to B(x+10,y) are acquired by being correlated with the coordinates (x,y) to (x+10,y) in the image. As exemplified in FIGS. 10(*b*) and 10(*c*), the depth is acquired and the filter order is set for each pixel.

FIGS. 11(*a*) to 11(*f*) are diagrams illustrating an image for which the panning is performed according to the first embodiment. FIGS. 11(*a*) to 11(*f*) show pixel groups in the image captured by the lens at the respective time points of time points T0 to T5. The time points are earlier in order of the time points T0, T1, T2, T3, T4 and T5. In addition, I(x,y) to I(x+4,y) are pixel value of pixels in the moving body region, and I(x+5,y) to I(x+10,y) are pixel values of pixels of a subject located in front of the moving body. A movement direction of the moving body is assumed as the –X direction. As shown in FIG. 11(*a*), at the time point T0), the moving body is in a state of being hidden by the subject in front of the moving body. As shown in FIGS. 11(*b*) to 11(*f*), the moving body gradually reveals its appearance at the time points T1 to T5. The subject in I(x+5,y) to I(x+10,y) is actually stationary at the time points T0 to T5, but moves in the X direction on the image captured by the lens. On the other hand, the moving body in I(x,y) to I(x+4,y) actually moves, but does not move in the image captured by the lens. This is because a photographer moves the imaging apparatus in the movement direction to follow the moving body. For this reason, when the photographer performs imaging operations by opening the shutter during the time period of the time points T0 to T5, it is possible to obtain a panning image where the moving body is not blurred and the stationary subject is blurred in the X direction reverse to the movement direction. The imaging apparatus 100 can generate such a panning image from a normal image.

FIG. 12 is a diagram illustrating an example of the images before and after the smoothing process is performed according to the first embodiment. The pixel values on the upper side of FIG. 12(*a*) are pixel values in the image before the smoothing process is performed. The pixel values on the lower side of FIG. 12(*a*) are pixel values in the image after the smoothing process is performed. In FIG. 12, a direction of the smoothing (a direction of the blurring) is the –X direction. In addition, pixels (x,y) to (x+4,y) are in the moving body region, and pixels (x+5,y) to (x+10,y) represent the stationary subject. The explanation is given by taking into consideration a case where the filter order of the pixel (x+9,y) is 6. In this case, I(x+9,y)/6 is added to pixel values after being smoothed of the pixels excluding the pixel (x+4,y) in the moving body region among six pixels which are continuously located in the –X direction from the pixel (x+9,y) on the basis of Expression 2, as shown in the following Expression (7).

$$\begin{cases} I'(x+5, y) \mathrel{+}= I(x+9, y)/6 \\ I'(x+6, y) \mathrel{+}= I(x+9, y)/6 \\ I'(x+7, y) \mathrel{+}= I(x+9, y)/6 \\ I'(x+8, y) \mathrel{+}= I(x+9, y)/6 \\ I'(x+9, y) \mathrel{+}= I(x+9, y)/6 \end{cases} \quad (7)$$

Here, the explanation is given by taking into consideration a case where the filter orders of the pixels (x+5,y) to (x+9,y) are all 6 and the filter order of the pixel (x+10,y) is 5. In this case, as shown in FIG. 12(*b*), the values of I(x+5,y)/6 to I'(x+5,y)/6 are added to I'(x+5,y), but the value of the sixth I(x+10,y)/5 is not added to I'(x+5,y). For this reason, in I'(x+5,y), 5 which is the number of times being added is not consistent with 6 which is the denominator. Therefore, the normalization is performed by calculating a normalization coefficient.

Figure 13:
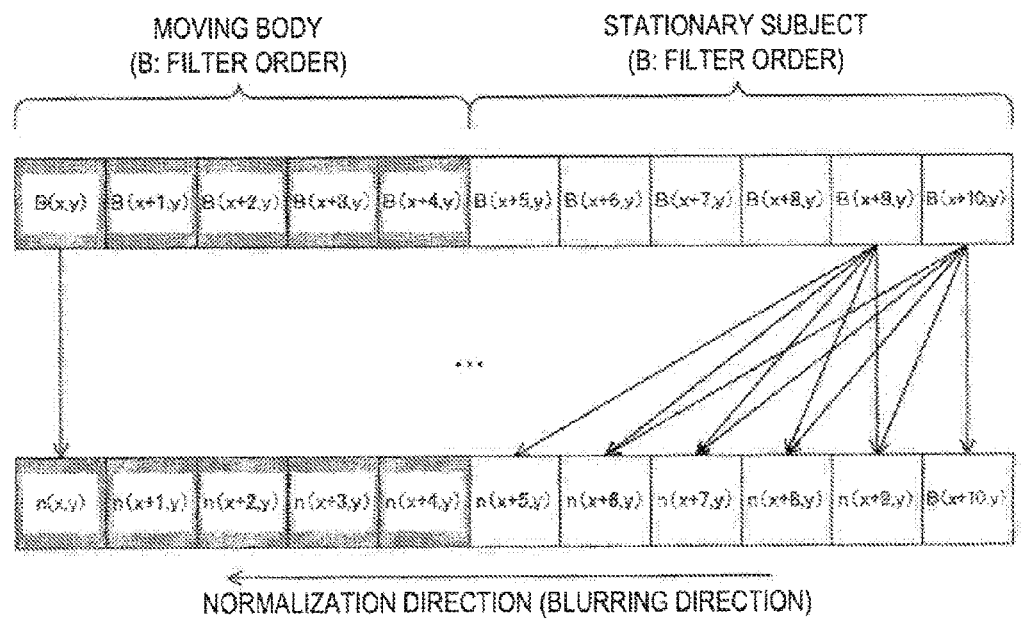
FIG. 13 is a diagram illustrating an example of a normalization coefficient according to the first embodiment.

FIG. 13 is a diagram illustrating an example of the normalization coefficient according to the first embodiment. The upper side of FIG. 13 shows a filter order of each pixel, and the lower part thereof shows a normalization coefficient of each pixel. In a case where the filter order B(x+9,y) of the pixel (x+9,y) is 6, ⅙ is added to the normalization coefficients of pixels excluding the moving body among six pixels which are continuously located in the –X direction from the pixel on the basis of Expression (3), as shown in the following Expression (8).

$$\begin{cases} n(x+5, y) \mathrel{+}= 1/6 \\ n(x+6, y) \mathrel{+}= 1/6 \\ n(x+7, y) \mathrel{+}= 1/6 \\ n(x+8, y) \mathrel{+}= 1/6 \\ n(x+9, y) \mathrel{+}= 1/6 \end{cases} \quad (8)$$

In a case where the filter orders of the pixels (x+5,y) to (x+9,y) are 6 and the filter order of the pixel (x+10,y) is 5, the normalization coefficient n(x+5,y) of the pixel (x+5,y) becomes 5/6. For this reason, if I'(x+5,y) is removed from the normalization coefficient n(x+5,y), the denominator is consistent with the number of times being added, and an average value of I(x+5,y) to I(x+9,y) is calculated as I'(x+5,y).

Figure 14:
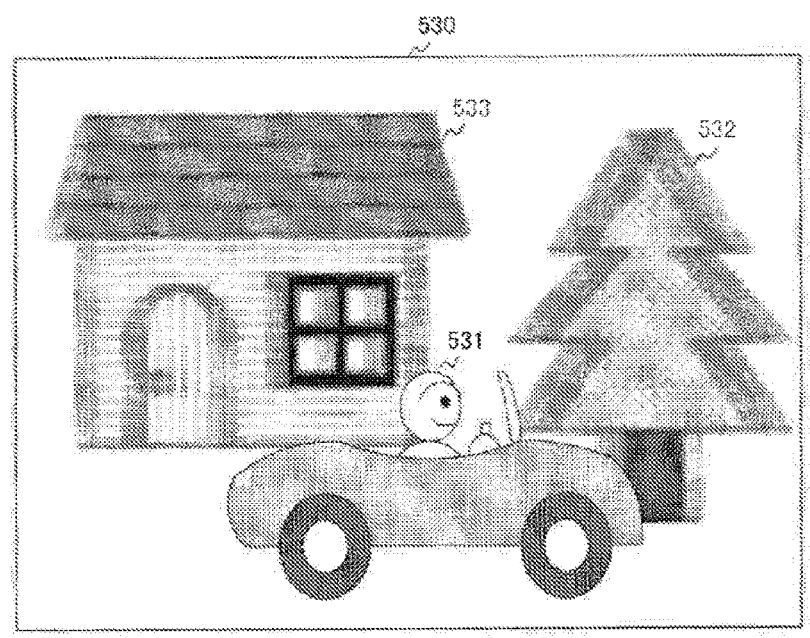
FIG. 14 is a diagram illustrating an example of a panning image according to the first embodiment.

FIG. 14 is a diagram illustrating an example of the panning image 530 according to the first embodiment. As shown in FIG. 14, the subject 531 of the moving body is not smoothed, and the subject 532 of the tree and the subject 533 of the house on the background are both smoothed. In this regard, it is assumed that the subject 532 is located in front of the subject 533 and has a smaller depth than the subject 533. In this case, the filter order of the subject 533 is set to be lower than the filter order of the subject 532 according to the depths. For this reason, an amount of blur of the subject 533 which is located far away than the subject 532 becomes smaller than an amount of blur of the front subject 532. In this way, since the subject 531 of the moving body is not blurred and an amount of blur is varied depending on the depths in the background, it is possible to obtain a natural panning image.

[Operation Example of Image Processing Device]

Figure 15:
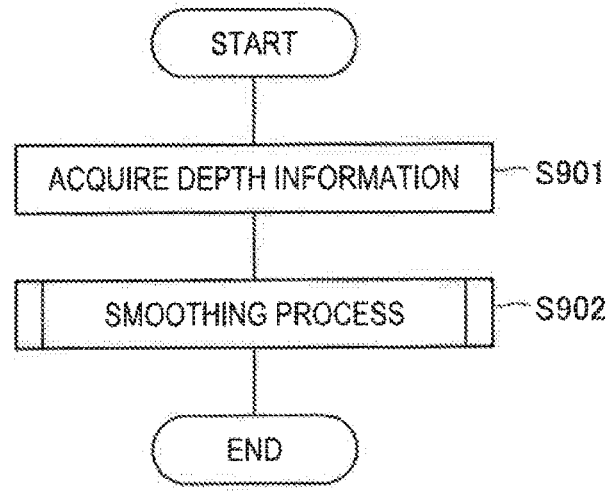
FIG. 15 is a flowchart illustrating an example of the operation of an image processing device according to the first embodiment.

FIG. 15 is a flowchart illustrating an example of the operation of the image processing device 350 according to the first embodiment. This operation is started when depths are measured along with capturing of images and an operation signal for setting smoothing parameters is input. The image processing device 350 acquires depth information (step S910). The image processing device 350 then performs a smoothing process (step S920). After step S920, the image processing device 350 ends the operation for processing images.

Figure 16:
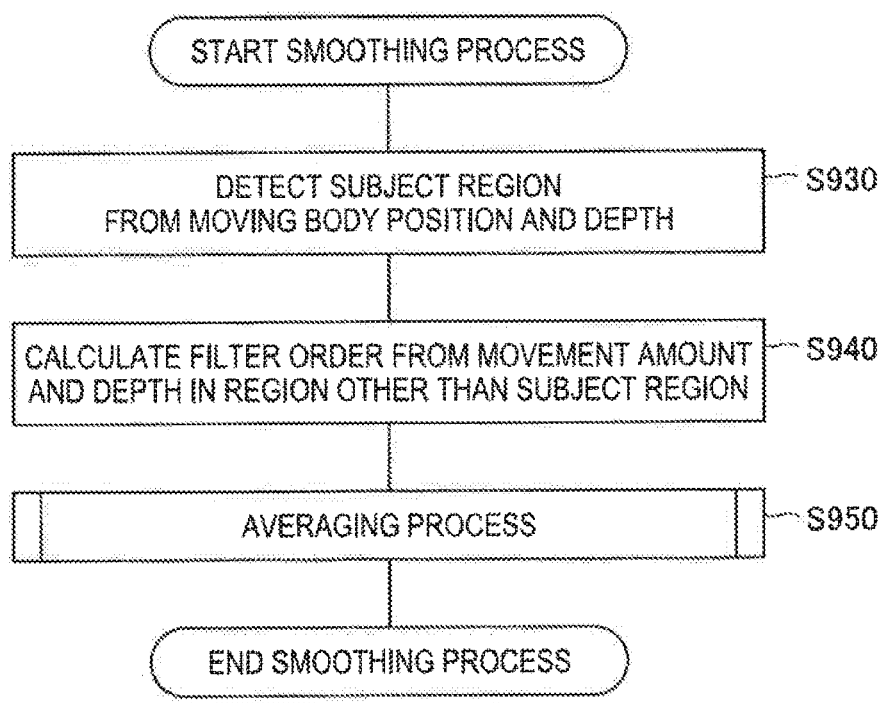
FIG. 16 is a flowchart illustrating an example of a smoothing process according to the first embodiment.

FIG. 16 is a flowchart illustrating an example of the smoothing process according to the first embodiment. The smoothing processing unit 370 detects a subject region from a moving body position and depth (step S930). The smoothing processing unit 370 calculates a filter order in correlation with a target pixel from a movement amount and depth in a region other than the subject region (step S940). The smoothing processing unit 370 performs an averaging process on the basis of the moving average method (step S950). After step S950, the smoothing processing unit 370 ends the smoothing process.

Figure 17:
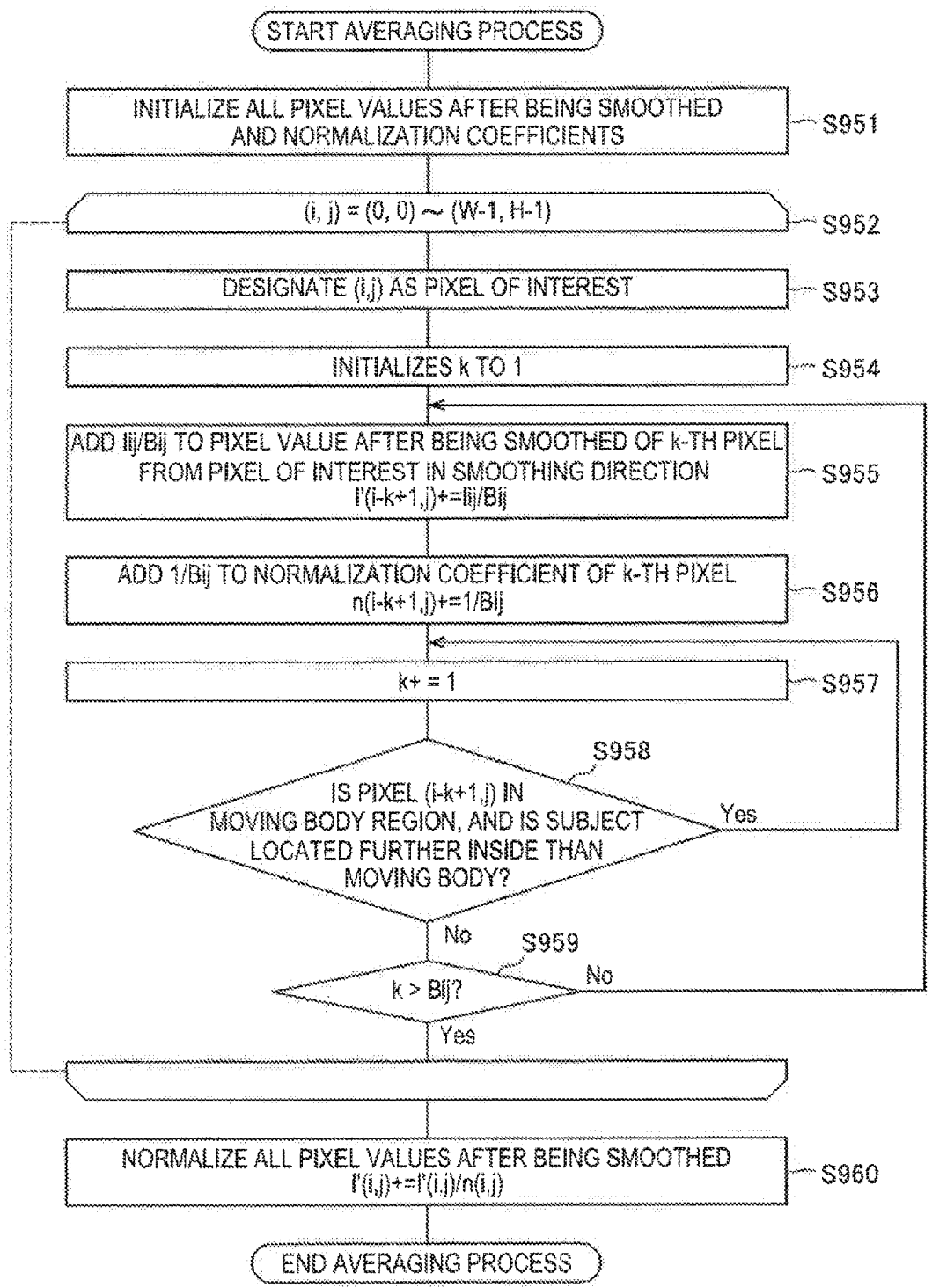
FIG. 17 is a flowchart illustrating an example of an averaging process according to the first embodiment.

FIG. 17 is a flowchart illustrating an example of the averaging process according to the first embodiment. A smoothing direction is assumed as the −X direction. First, the smoothing filter 375 initializes all the pixel values after being smoothed and the normalization coefficients (step S951). In addition, the smoothing filter 375 initializes both i and j to zero (0) and starts a loop process. In this loop process, the smoothing filter 375 increments i or j by 1 whenever after processes in steps S953 to S958 described later are performed. After i or j is incremented, if i>W−1 and j>H−1, then the smoothing filter 375 ends the loop process, otherwise the flow returns to step S953 and the smoothing filter 375 continues to perform the loop process (step S952).

In the loop process (step S952), the smoothing filter 375 designates the pixel (i,j) as a pixel of interest (step S953). The smoothing filter 375 then initializes a value of k to 1. In this regard, k is an integer equal to or more than 1 (step S954). The smoothing filter 375 adds Iij/Bij to a pixel value after being smoothed of the k-th pixel (i−k+1,j) from the pixel of interest in the smoothing direction (step S955). The smoothing filter 375 then adds 1/Bij to the normalization coefficient of the k-th pixel (i−k+1,j) from the pixel of interest (step S956). The smoothing filter 375 adds 1 to k (step S957). The smoothing filter 375 then determines whether or not the pixel (i−k+1,j) is a pixel in the moving body region and the subject of the pixel (i−k+1 j) is located further inside than the moving body. Whether or not the subject is located further inside than the moving body is determined depending on whether or not the depth of the pixel (i−k+1,j) is larger than the depth of the pixel in the moving body region (step S958). If the pixel (i−k+1,j) is in the moving body region and the subject is located further inside than the moving body (step S958: Yes), then the flow returns to step S957. If the pixel (i−k+1 j) is not in the moving body region or if the subject is not located further inside than the moving body (step S958: No), then the smoothing filter 375 determines whether or not k is larger than Bij (step S959). Ilk is equal to or smaller than Bij (step S959: No), the flow returns to step S955. If k is larger than Bij (step S959: Yes), then the smoothing filter 375 increments i or j by 1, and determines whether or not the loop process (step S952) is ended. If the loop process (step S952) is not ended, the flow returns to step S953.

If the loop process (step S952) is finished, the smoothing filter 375 normalizes all the pixel values after being smoothed by performing calculations according to Expression (4) (step S960). After step S960, the smoothing filter 375 ends the averaging process.

As such, according to the first embodiment, the image processing device 350 acquires the depth to subject in correlation with the pixels in the image. In addition, the image processing device 350 performs the degree of the smoothing process according to a depth corresponding to a target pixel in the region other than the moving body region for a pixel value of the target pixel in a predetermined direction, thereby causing blurring. Since the moving body region is not smoothed and other region is smoothed according to the depth, an image equivalent to an image obtained by performing panning is generated from a normal image without depending on a photographer's skill.

In addition, when a moving body position is set, the smoothing processing unit 370 detects a pixel group of depths where a difference with the depth of the moving body position is within a predetermined value, as a moving body region. For this reason, the smoothing processing unit 370 can detect the moving body region from the moving body position even if not the entire moving body region is set.

In addition, the smoothing processing unit 370 performs the smoothing process by the use of the simple moving average filter. By using the simple moving average filter, the smoothing processing unit 370 can easily blur the contour of a subject.

In addition, although the image processing device 350 is included in the imaging apparatus 100, the image processing device 350 may not be included in the imaging apparatus 100, and the image processing device 350 and the imaging apparatus 100 may be implemented by separate elements.

In addition, the image processing device 350 calculates a filter order from a movement amount and a depth on the basis of Expression (1). However, as long as the larger the movement amount is, the higher the filter order is, and the larger the depth is, the lower the filter order is, an expression for calculating the filter order is not limited to Expression (1). For example, the image processing device 350 may calculate the filter order on the basis of the n-th power (where n is an integer of 2 or more) of the movement amount S or the depth D.

In addition, although the smoothing parameter setting section 371 sets a moving body position, it is possible to cause the smoothing parameter setting section 371 to directly set the moving body region by detecting an operation where a user traces a contour of the moving body region with a stylus or the like.

Further, although the image processing device 350 generates information indicating pixels of the contour of the moving body region as moving body region information, the moving body region information is not limited to information indicating pixels of the contour of the moving body region as long as the information indicates a moving body region. For example, the image processing device 350 may generate information indicating all the pixels in the moving body region as moving body region information. Also, the image processing device 350 may use image data where all the pixels in the moving body region are set to any one of 1 or 0, and all the pixels in a region other than the moving body region are set to the other value, as moving body region information.

Although the image processing device 350 performs the smoothing process using the simple moving average filter, the smoothing process may be performed using a filter other than the simple moving average filter. For example, the image processing device 350 may use a moving average filter such as a weighted average filter or an exponential moving average filter instead of the simple moving average filter. In addition, the image processing device 350 may perform the smoothing process using a Gaussian filter or the like instead of the moving average filters.

In addition, although the image processing device 350 sets a filter order according to a depth, parameters other than the filter order may be set according to a depth as long as the parameters change the degree of smoothing. For example, in a case where the weighted average filter is used, the image processing device 350 may set a weighting coefficient according to a depth.

In addition, although the imaging apparatus 100 detects a drag operation and sets an average value parameter, the imaging apparatus 100 may detect other operations and set the average value parameter. For example, the imaging apparatus 100 may detect an operation where a numerical value is input with a button or like and may set the average value parameter.

2. Second Embodiment

Configuration Example of Imaging Apparatus

Figure 18:
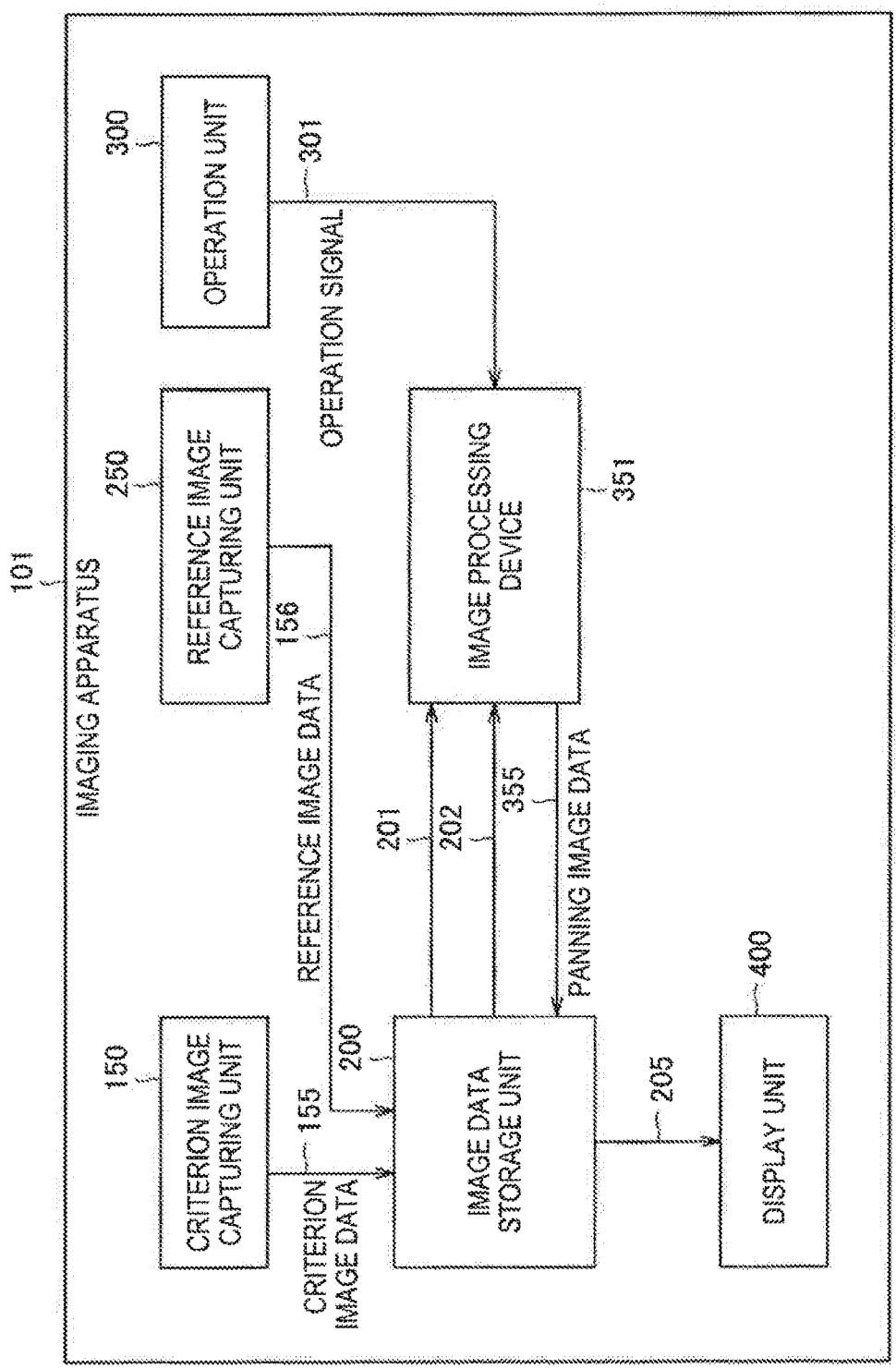
FIG. 18 is a block diagram illustrating a configuration example of an imaging apparatus according to a second embodiment.

Next, a second embodiment of the present disclosure will be described with reference to FIGS. 18 to 22. FIG. 18 is a block diagram illustrating a configuration example of the imaging apparatus 101 according to the second embodiment. The imaging apparatus 101 is different from the imaging apparatus 100 according to the first embodiment in that the imaging apparatus 101 generates depth information using a stereo matching method. Details of the stereo matching method will be described later. The imaging apparatus 101 is different from the imaging apparatus 100 in that the imaging apparatus 101 includes a criterion image capturing unit 151 and a reference image capturing unit 152 instead of the capturing unit 150. Also, the imaging apparatus 101 is different from the imaging apparatus 100 in that the imaging apparatus 101 includes an image processing device 351 instead of the image processing device 350 and does not include the depth measurement unit 250.

The criterion image capturing unit 151 captures a criterion image. In this regard, the criterion image is used as a criterion in calculating a depth. For example, one of a right image captured by the right lens of the imaging apparatus 101 and a left image captured by the left lens is regarded as a criterion image. The criterion image capturing unit 151 provides criterion image data indicating the captured criterion image to the image data storage unit 200 via the signal line 155.

The reference image capturing unit 152 captures a reference image. In this regard, the reference image is captured in synchronization with the criterion image, and is referred to in calculating a depth. For example, an image other than the criterion image of the right image and the left image is regarded as the reference image. The reference image capturing unit 152 provides reference image data indicating the captured reference image to the image data storage unit 200 via the signal line 156.

The image processing device 351 reads out the criterion image data and the reference image data from the image data storage unit 200. The image processing device 351 calculates depths in correlation with pixels from the criterion image and the reference image by the use of the stereo matching method. The image processing device 351 performs the smoothing process for the criterion image on the basis of smoothing parameters and depths.

[Configuration Example of Image Processing Device]

Figure 19:
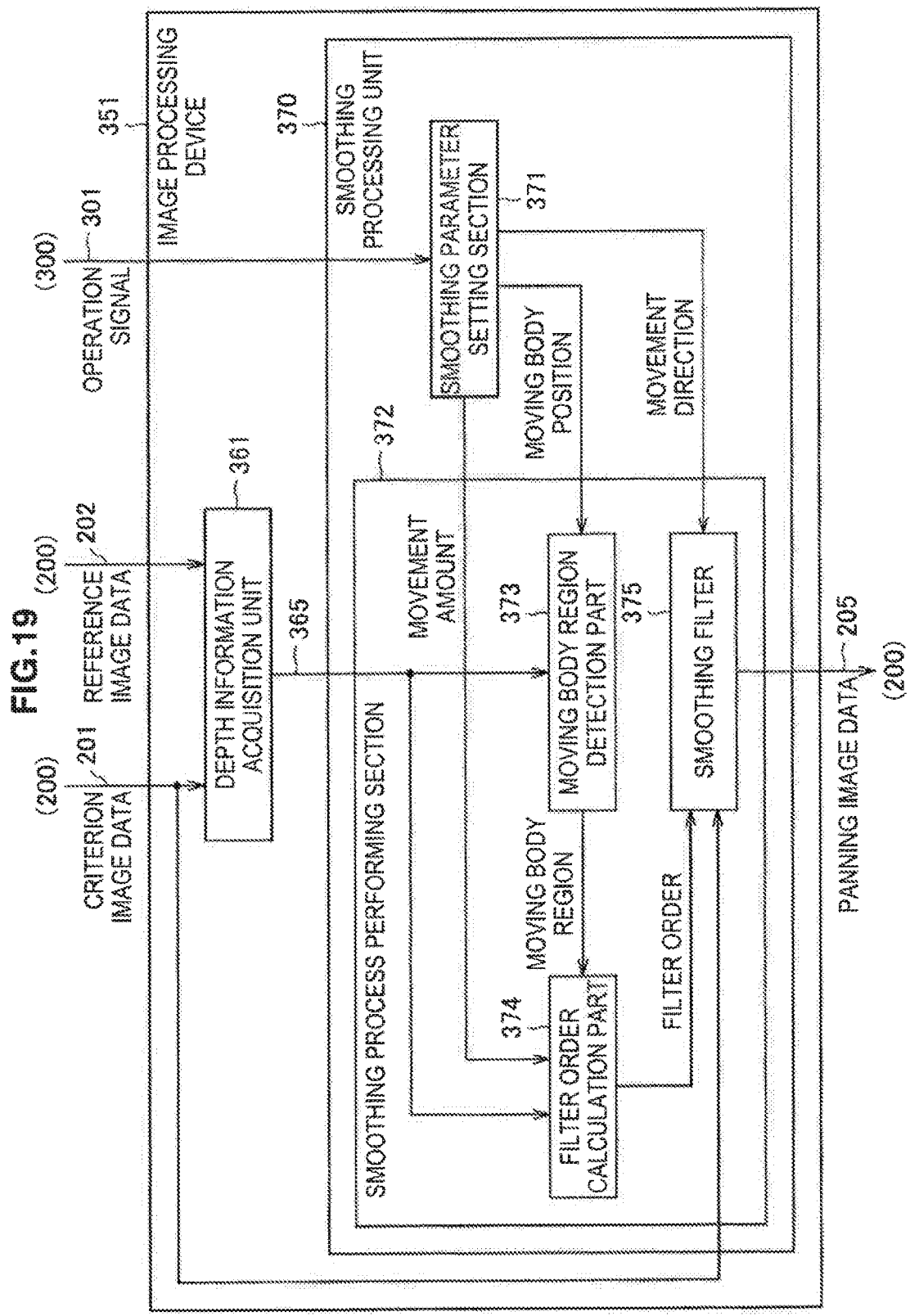
FIG. 19 is a block diagram illustrating a configuration example of an image processing device according to the second embodiment.

FIG. 19 is a block diagram illustrating a configuration example of the image processing device 351 according to the second embodiment. The image processing device 351 is different from the image processing device 350 according to the first embodiment in that the image processing device 351 includes a depth information acquisition unit 361 instead of the depth information acquisition unit 360.

Figure 20:
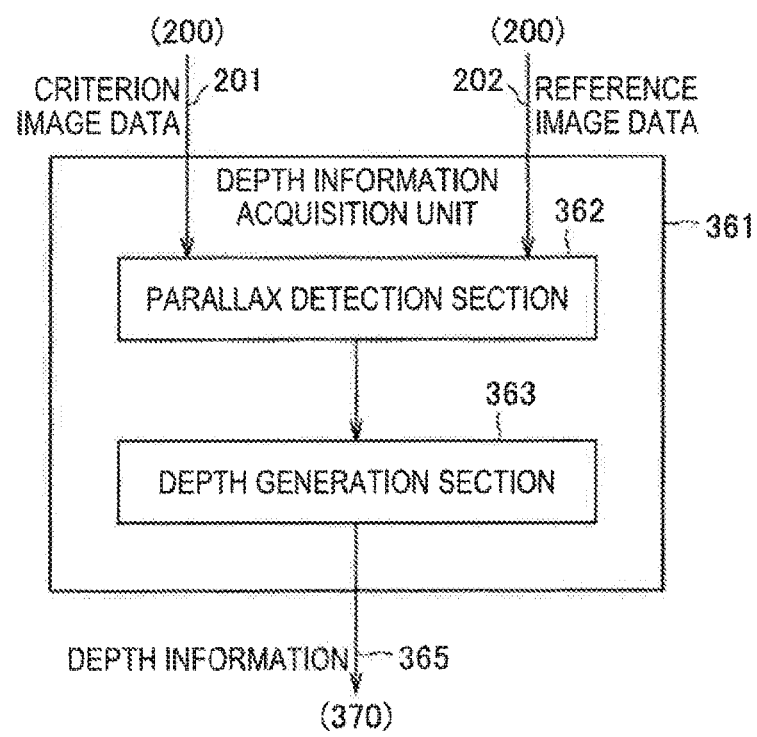
FIG. 20 is a block diagram illustrating a configuration example of a depth information acquisition unit according to the second embodiment.

FIG. 20 is a block diagram illustrating a configuration example of the depth information acquisition unit 361 according to the second embodiment. The depth information acquisition unit 361 includes a parallax detection section 362 and a depth generation section 363.

The parallax detection section 362 detects a parallax from the criterion image and the reference image. Specifically, the parallax detection section 362 reads out the criterion image data and the reference image data from the image data storage unit 200. The parallax detection section 362 uses any pixel in the criterion image as a meet point, and obtains a corresponding point corresponding to the target point in the reference image. The parallax detection section 362 detects an absolute value of a difference between a horizontal coordinate of the target point and a horizontal coordinate of die corresponding point, as a parallax. The parallax detection section 362 detects parallaxes for all the pixels and provides the parallaxes to the depth generation section 363.

The depth generation section 363 generates depth information from the parallaxes. A method of obtaining depths from the parallaxes will be described later. The depth generation section 363 obtains depths in correlation with pixels and generates depth information. The depth generation section 363 provides the depth information to the smoothing processing unit 370.

Figure 21:
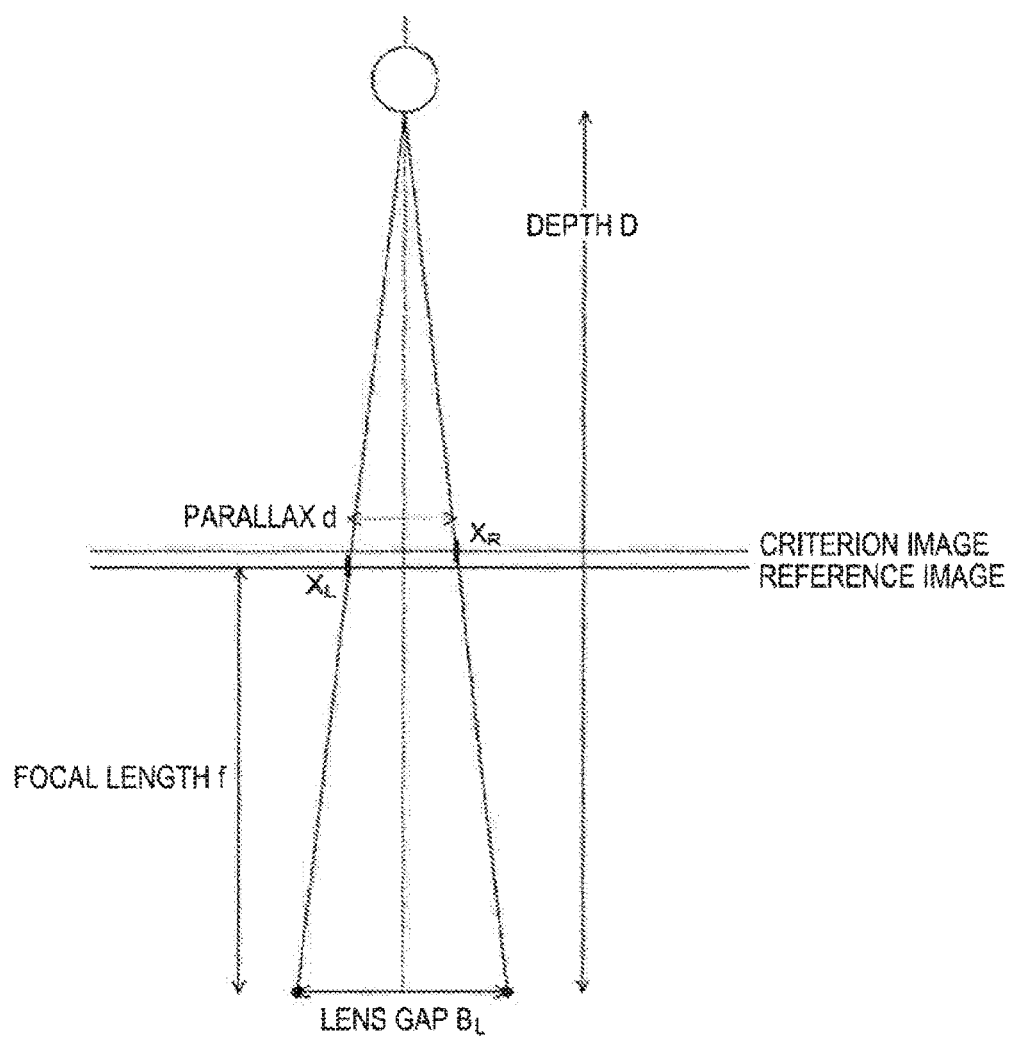
FIG. 21 is a diagram illustrating an example of a relationship between parallax and depth according to the second embodiment.

FIG. 21 is a diagram illustrating an example of the relationship between the parallax and the depth according to the second embodiment. It is assumed that a horizontal coordinate of the target point in the criterion image is $X_R$ and a horizontal coordinate of the corresponding point in the reference image is $X_L$. In this case, the parallax d is calculated by the following Expression (9).

$$d = |X_R - X_L| \qquad (9)$$

In addition, it is assumed that a gap between the lenses of the criterion image capturing unit 151 and the reference image capturing unit 152 is $B_L$, and a focal length is f. In this case, a triangle formed by the target point, the corresponding point, and the subject is similar to a triangle formed by the lens of the criterion image capturing unit 151, the lens of the reference image capturing unit 152, and the subject. For this reason, a relational expression shown in the following Expression (10) is established.

$$d:f = B_L:D \qquad (10)$$

In Expression (10), "D" denotes a depth to the subject. Expression (10) may be transformed into the following Expression (11).

$$D = B_L f / d \qquad (11)$$

Since $B_L$ and f are known values, a detected parallax d is assigned to Expression (11), and thus the depth D is calculated.

[Operation Example of Image Processing Device]

Figure 22:
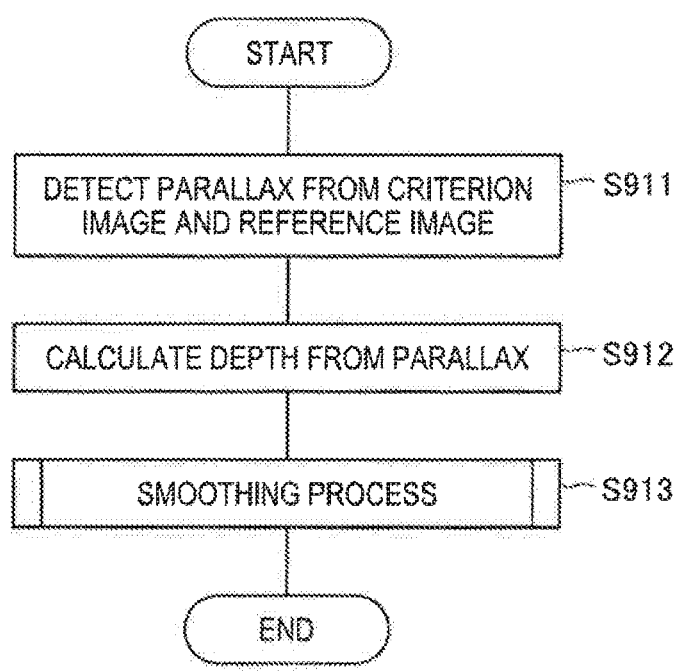
FIG. 22 is a flowchart illustrating an example of the image processing device according to the second embodiment.

FIG. 22 is a flowchart illustrating an example of the operation of the image processing device 351 according to the second embodiment. An operation performed by the image processing device 351 is different from the operation of the image processing device 350 in that the image processing device 351 performs processes in steps S911 and S912 instead of the process in step S910.

The image processing device 351 detects a parallax from the criterion image and the reference image (step S911). In addition, the image processing device 351 calculates a depth from the parallax on the basis of Expression (11) (step S912).

As above, according to the second embodiment, the image processing device 351 detects a parallax from the criterion image and the reference image and generates a depth on the basis of the parallax. For this reason, the image processing device 351 can directly generate depth information.

It should be understood by those skilled in the art that various modifications, combinations, sub-combinations and alterations may occur depending on design requirements and other factors insofar as they are within the scope of the appended claims or the equivalents thereof.

In addition, the process procedures in the above-described embodiments may be grasped as a method including the series of procedures, and may be grasped as a program for causing a computer to execute the series of procedures or a recording medium storing the program thereon. The recording medium may use, for example, a CD (Compact Disc), an MD (Mini Disc), a DVD (Digital Versatile Disk), a memory card, a Blu-ray Disc (registered trademark), or the like.

Additionally, the present technology may also be configured as below.

(1)

An image processing device comprising:

a depth acquisition unit for acquiring a depth to a subject in correlation with a pixel in a captured image of the subject: and a smoothing processing unit for designating a pixel in a region excluding a predetermined region in the image as a target pixel, and for performing a smoothing process of the degree according to the depth corresponding to the target pixel for a pixel value of the target pixel in a predetermined direction.

(2)

The image processing device according to (1), wherein the smoothing processing unit includes a smoothing parameter setting section for setting smoothing parameters indicating characteristics of the smoothing process; and a smoothing process performing section for performing the smoothing process on the basis of the set smoothing parameters and the acquired depth.

(3)

The image processing device according to (2), wherein the smoothing process performing section includes a calculation part for calculating the degree of the smoothing process on the basis of the amount prescribed in the smoothing parameters and the acquired depth; and a smoothing filter for performing the calculated degree of the smoothing process.

(4)

The image processing device according to (2) or (3), wherein the smoothing parameter setting section sets the smoothing parameters including a direction in which the smoothing process is performed, as the predetermined direction, and wherein the smoothing process performing section performs the smoothing process in the set direction on the basis of the acquired depth.

(5)

The image processing device according to any one of (2) to (4), wherein the smoothing parameter setting section sets the smoothing parameters including information indicating a region for which the smoothing process is not performed as the predetermined region, and wherein the smoothing process performing section designates a pixel in a region excluding the set region as a target pixel, and performs the smoothing process on the basis of the acquired depth.

(6)

The image processing device according to any one of (2) to (4), wherein the smoothing parameter setting section sets the smoothing parameters including information indicating one or more pixels in the predetermined region, and wherein the smoothing process performing section includes a region detection part for detecting a region including the pixels related to the depths where a difference with the depths corresponding to the one or more pixels is equal to or smaller than a predetermined value; and a smoothing filter for designating a pixel in a region excluding the detected region as the target pixel, and for performing the smoothing process on the basis of the acquired depth.

(7)

The image processing device according to any one of (1) to (6), wherein the smoothing processing unit performs the smoothing process using a moving average filter.

(8)

The image processing device according to any one of (1) to (6), wherein the smoothing processing unit performs the smoothing process using a Gaussian filter.

(9)

The image processing device according to any one of (1) to (8), wherein the image includes a criterion image regarded as a criterion and a reference image referred to when the depth is generated, wherein the depth acquisition unit includes a parallax detection section for detecting a distance between any one pixel in the criterion image and a pixel in the reference image corresponding to the pixel as a parallax; and a depth generation section for generating the depth in correlation with the pixel in the criterion image on the basis of the detected parallax, and wherein the smoothing processing unit designates a pixel in a region excluding the predetermined region in the criterion image as the target pixel and performs the smoothing process.

(10)

A method of controlling an image processing device, the method comprising:

acquiring, with a depth acquisition unit, a depth to a subject in correlation with a pixel in a captured image of the subject; and designating, with a smoothing processing unit, a pixel in a region excluding a predetermined region in the image as a target pixel, and performing, with the smoothing processing unit, a smoothing process of the degree according to the depth corresponding to the target pixel for a pixel value of the target pixel in a predetermined direction.

(11)

A program for causing a computer to execute a process, the process comprising:

acquiring, with a depth acquisition unit, a depth to a subject in correlation with a pixel in a captured image of the subject; and designating, with a smoothing processing unit, a pixel in a region excluding a predetermined region in the image as a target pixel, and performing, with the smoothing processing unit, a smoothing process of the degree according to the depth corresponding to the target pixel for a pixel value of the target pixel in a predetermined direction.

What is claimed is:

1. An image processing device performing processing on a captured image, the device comprising:
   a smoothing processing unit configured to perform a smoothing process on a pixel in a region outside a predetermined region including a set target in the captured image based on a depth corresponding to a pixel in the captured image and a set movement direction of the set target in the captured image,
   wherein the smoothing processing unit is implemented via at least one processor.

2. The image processing device according to claim 1, wherein
   the smoothing processing unit is further configured to perform the smoothing process according to a movement amount of the set target and a movement direction of the set target.

3. The image processing device according to claim 2, wherein
   the smoothing processing unit includes
      a region detection part configured to detect a region including pixels related to depths where a difference with the depths corresponding to the one or more pixels is equal to or smaller than a predetermined value; and
      a smoothing filter configured to perform the smoothing process on the pixel in the region outside the detected region on the basis of the depth, and
   wherein the region detection part is implemented via at least one processor.

4. An image processing method of performing processing on a captured image, the method comprising:
   performing a smoothing process on a pixel in a region outside a predetermined region including a set target in the captured image based on a depth corresponding to a pixel in the captured image and a set movement direction of the set target in the captured image.

5. The image processing method according to claim 4, wherein
   the smoothing process is performed according to a movement amount of the set target and a movement direction of the set target.

6. The image processing method according to claim 5, further comprising:
   detecting a region including pixels related to depths where a difference with the depths corresponding to the one or more pixels is equal to or smaller than a predetermined value; and
   performing the smoothing process on the pixel in the region outside the detected region on the basis of the depth.

7. A non-transitory computer-readable medium having embodied thereon a program, which when executed by a computer causes the computer to perform an image processing method of performing processing on a captured image, the method comprising:
   performing a smoothing process on a pixel in a region outside a predetermined region including a set target in the captured image based on a depth corresponding to a pixel in the captured image and a set movement direction of the set target in the captured image.

* * * * *